(12) United States Patent
Drumright et al.

(10) Patent No.: US 6,313,252 B1
(45) Date of Patent: Nov. 6, 2001

(54) FUNCTIONALIZED ETHYLENE/VINYL OR VINYLIDENE AROMATIC INTERPOLYMERS

(75) Inventors: Ray E. Drumright, Midland, MI (US); Robert H. Terbrueggen, Pasadena, CA (US); Kenneth A. Burdett, Midland, MI (US); Francis J. Timmers, Midland, MI (US); Stephen F. Hahn, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/244,921

(22) Filed: Feb. 4, 1999

(51) Int. Cl.$^7$ .................................................. C08F 212/08
(52) U.S. Cl. .......................... 526/347; 526/308; 526/314; 526/318.1; 526/324; 526/325; 526/307.4; 526/282; 525/333.3; 525/333.4; 525/333.5; 525/333.6; 525/379; 525/383; 525/343; 525/279; 525/268; 525/309; 525/311
(58) Field of Search ............................. 525/333.3, 333.4, 525/333.5, 333.6, 379, 383, 343, 279, 268, 309, 311; 526/347, 308, 314, 318.1, 324, 282, 325, 307.4

(56) References Cited

U.S. PATENT DOCUMENTS

| | | | |
|---|---|---|---|
| 3,072,618 | 1/1963 | Turbak | 260/79.3 |
| 3,870,841 | 3/1975 | Makowski et al. | 260/23.7 |
| 4,074,035 | 2/1978 | Powers et al. | 526/185 |
| 4,568,700 | 2/1986 | Warshawsky et al. | 521/31 |
| 5,532,322 | 7/1996 | Kadono et al. | 525/357 |
| 5,543,484 | 8/1996 | Ghung et al. | 526/347.1 |
| 5,637,650 | 6/1997 | Gill et al. | 525/356 |
| 5,866,659 | * 2/1999 | Chung et al. | 525/279 |

FOREIGN PATENT DOCUMENTS

| | | | |
|---|---|---|---|
| 606400 | 8/1948 | (GB) . | |
| 1186755 | 7/1966 | (GB) | C08F/27/00 |
| 91/04992 | 4/1991 | (WO) | C08F/8/00 |
| 98/05692 | 2/1998 | (WO) | C08F/8/00 |
| WO 98/09999 | * 3/1998 | (WO) . | |

OTHER PUBLICATIONS

Rev. Macromol, *Chem. Phys.*, "Chloromethylation of Polystyrenes and Styrene Copolymers. Applications", pp. 505–557, (1987–88).

Rev. Macromol, *Chem. Phys.*, "Chemical Transformations of Chloromethylated Polystyrene", pp. 503–592, (1988).

Giffin D. Jones, *Industrial and Engineering Chemistry*, vol.44, No. 11, "Chloromethylation of Polystyrene", pp. 2686–2693, (1952).

Michael E. Wright, *Macromolecules*, vol. 24, "Details Concerning the Chloromethylation of Soluble High Molecylar Weight Polystyrene Using Dimethoxymethane, Thionyl Chloride, and a Lewis Acid: A Full Analysis", pp. 5879–5880, (1991).

* cited by examiner

*Primary Examiner*—David W. Wu
*Assistant Examiner*—Ling-Siu Choi

(57) ABSTRACT

Novel substantially random functionalized interpolymers and processes for making them are disclosed. The novel interpolymers include those prepared from ethylene and vinyl aromatic monomers such as ethylene-styrene interpolymers which are then functionalized with a variety of electrophilic and nucleophilic reagents.

12 Claims, No Drawings

FUNCTIONALIZED ETHYLENE/VINYL OR VINYLIDENE AROMATIC INTERPOLYMERS

FIELD OF THE INVENTION

The present invention pertains to functionalized interpolymers of ethylene or one or more α-olefin monomers, or combinations thereof, with one or more vinyl or vinylidene aromatic monomers or one or more sterically hindered aliphatic or cycloaliphatic vinyl or vinylidene monomers, or combination thereof, and methods of preparing the interpolymers.

BACKGROUND OF THE INVENTION

The generic class of materials of α-olefin/vinyl or vinylidene monomer substantially random interpolymers, including materials such as substantially random α-olefin/vinyl aromatic monomer interpolymers, and their preparation, are known in the art, such as described in U.S. Pat. No. 5,703,187 (EP 416 815 A2), the contents of which are herein incorporated by reference.

These materials offer a wide range of material structures and properties which makes them useful for varied applications, such as, for example, asphalt modifiers or as compatibilizers for blends of polyethylene and polystyrene, as described in U.S. Pat. No. 5,460,818 the contents of which are herein incorporated by reference.

The structure, thermal transitions and mechanical properties of substantially random interpolymers of ethylene and styrene containing up to about 50 mole percent styrene have been described (see Y. W. Cheung, M. J. Guest; *Proc. Antec* '96 pp. 1634–1637) the contents of which are herein incorporated by reference. These polymers are found to have glass transitions in the range of −20° C. to +35° C., and show no measurable crystallinity above about 25 mole percent styrene incorporation, that is they are essentially amorphous.

Although of utility in their own right, industry is constantly seeking to improve the applicability of the substantially random interpolymers. To perform well in certain applications, it may be desirable to modify the properties of these interpolymers. One method of modifying the properties of the substantially random interpolymers is to functionalize the vinyl or vinylidene group subsequent to interpolymer formation. WO 97/05175 describes functionalized styrene polymers and copolymers and WO 96/16096 describes alpha olefin/para-alkyl styrene copolymers and functionalized copolymers thereof, the contents of both of which are herein incorporated by reference.

Thus, it would be advantageous to discover a method of modifying the conventional substantially random interpolymers. Further, it would be advantageous if such a method could be applied to a variety of interpolymers to form a variety of new, modified interpolymers.

BRIEF SUMMARY OF THE INVENTION

The present invention relates to a functionalized substantially random interpolymer comprising;

(a) from 0 to about 64.95 mole percent of repeating units represented by the following formula (I);

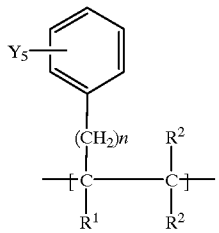

(I)

wherein Y is independently selected from the group consisting of hydrogen, substituted and unsubstituted alkyl radicals, benzyl radicals, aryl radicals, and aralkyl radicals containing up to 18 carbon atoms, —X, —CH$_2$X, —C(O)R$^6$, —(Z)—CO$_2$H, —(Z)—SO$_3$H, —NO$_2$, —C(O)—OR$^6$, —(Z)—OR$^6$, —N(R$^6$)$_2$, —(Z)—N(R$^6$)$_2$, —P(OR$^6$)$_2$, —(Z)—P(OR$^6$)$_2$, —P(R$^6$)$_2$, —(Z)—P(R$^6$)$_2$, —P(O)(R$^6$)$_2$, —(Z)—P(O)(R$^6$)$_2$, —P(O)(OR$^6$)$_2$, —(Z)—P(O)(R$^6$)$_2$, —(Z)—SR$^6$, —CN, —(Z)—CN, —CO$_2$H, —C(O)N(R$^6$)$_2$, —(Z)—C(O)N(R$^6$)$_2$, ionomeric salts of —CO$_2^-$, —(Z)—CO$_2^-$, —(Z)—SO$_3^-$, —N$^+$(R$^6$)$_3$, —(Z)—N$^+$(R$^6$)$_3$, —P$^+$(R$^6$)$_3$, —(Z)—P$^+$(R$^6$)$_3$, —(Z)—S$^+$(R$^6$)$_2$, or combinations thereof, R$^1$ is selected from the group of radicals consisting of hydrogen and alkyl radicals containing from about 1 to about 4 carbon atoms; R$^2$ is independently selected from the group of radicals consisting of hydrogen and alkyl radicals containing from about 1 to about 4 carbon atoms; R$^6$ is independently selected from the group of radicals consisting of hydrogen, substituted or unsubstituted alkyl radicals containing from about 1 to about 18 carbon atoms, and substituted or unsubstituted aryl radicals; X is a halogen; and Z is alkylene or arylene; and n has a value from zero to about 4;

(b) from about 0.05 to about 65 mole percent of repeating units represented by the following formula (II);

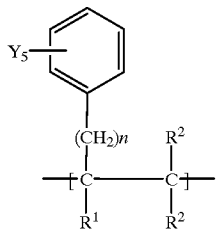

(II)

wherein Y, R$^1$, R$^2$, n, and X are as described for I with the proviso that at least one Y is not hydrogen or a substituted or unsubstituted alkyl radical;

(c) from 0 to about 25 mole percent of repeating units represented by the following formula (III);

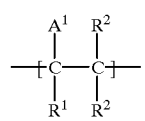

(III)

wherein R$^1$ and R$^2$ are as described for I and A$^1$ is a sterically bulky, aliphatic or cycloaliphatic substituent of up to about 20 carbons or R$^2$ and A$^1$ together form a ring system wherein the ring system formed by A$^1$ and R$^2$ is optionally substituted with one or more substituents selected from alkyl radicals having from 1 to 18 carbon atoms, —X, —CH$_2$X, —C(O)R$^6$, —(Z)—CO$_2$H, —(Z)—SO$_3$H, —NO$_2$, —C(O)OR$^6$, —(Z)—OR$^6$, —N(R$^6$)$_2$, —(Z)—N(R$^6$)$_2$, —P(OR$^6$)$_2$, —(Z)—P(OR$^6$)$_2$, —P(R$^6$)$_2$, —(Z)—P(R$^6$)$_2$, —P(O)(R$^6$)$_2$, —(Z)—P(O)(R$^6$)$_2$, —P(O)(OR$^6$)$_2$, —(Z)—P(O)(R$^6$)$_2$, —(Z)—SR$^6$, —CN, —(Z)—CN, —CO$_2$H, —C(O)N(R$^6$)$_2$, —(Z)—C(O)N(R$^6$)$_2$, ionomeric salts of —CO$_2^-$, —(Z)—CO$_2^-$, —(Z)—SO$_3^-$, —N$^+$(R$^6$)$_3$, —(Z)—N$^+$(R$^6$)$_3$, —P$^+$(R$^6$)$_3$, —(Z)—P$^+$(R$^6$)$_3$, —(Z)—S$^+$(R$^6$)$_2$, and mixtures thereof wherein R$^6$, X, and Z are as defined above for I; and (d) from 35 to 99.95 mole percent of repeating units represented by the following formula (IV);

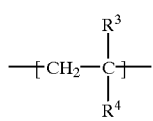

(IV)

wherein R$^3$ and R$^4$ are selected from the group consisting of hydrogen and alkyl radicals having from 1 to 18 carbon atoms, with the proviso that R$^3$ and R$^4$ are different alkyl radicals.

The invention also relates to processes of making the functionalized polymers described herein.

DETAILED DESCRIPTION OF THE INVENTION

The following definitions are used throughout the disclosure. The term "interpolymer" is used herein to indicate a polymer wherein at least two different monomers are polymerized to make the interpolymer. This includes copolymers, terpolymers, etc.

The term "repeating unit" as employed herein means a combination of atoms which may be represented by a formula wherein the formula occurs more than once in a given interpolymer chain.

The term "ionomer" or "ionomeric salt" as employed herein means a polymer containing interchain ionic bonding. Ionomeric salts are ionically crosslinked thermoplastics generally obtained by neutralizing a copolymer containing pendant acid groups, for example, carboxylic acid groups, with an ionizable compound, for example, a compound of the monovalent, divalent and/or trivalent metals of Group I, II, IV-A and VIIIB of the periodic table of the elements. Preferred ionomeric salts are obtained by reacting the functionalized interpolymers with a sufficient amount of base as to neutralize at least some portion of the acid groups, preferably at least 5 percent by weight and preferably from 20 to 100 percent by weight, of the acid groups present. Suitable bases include amines, salts of substituted and unsubstituted ammonium and phosphonium ions and salts of metal ions including Na$^+$, K$^+$, Li$^+$, Cs$^+$, Rb$^+$, Hg$^+$, Cu$^+$, Be$^{+2}$, Mg$^{+2}$, Ca$^{+2}$, Sr$^{+2}$, Cu$^{+2}$, Cd$^{+2}$, Hg$^{+2}$, Sn$^{+2}$, Pb$^{+2}$, Fe$^{+2}$, Co$^{+2}$, Ni$^{+2}$, Zn$^{+2}$, Al$^{+3}$, Sc$^{+3}$, and Y$^{+3}$. Basic salts of preferred metals suitable for neutralizing the copolymers used herein are the alkali metals, particularly, cations such as sodium, lithium and potassium and alkaline earth metals, in particular, cations such as sodium, calcium, magnesium and zinc. However also contemplated in the present invention are ionomeric salts in which the polymer bears a positive charge and the counterion bears the negative charge. Both organic and inorganic anions are included in the possible ionomeric salts where the polymer bears a positive charge, said anions including, but not limited to carboxylate, alkoxide, halide, borate, phenate, carbonate, bicarbonate, sulfate, nitrate, and bisulfate.

The term "substantially random" (in the substantially random interpolymer comprising monomer units derived from ethylene and/or one or more α-olefin monomers with one or more vinyl or vinylidene aromatic monomers and/or one or more sterically hindered aliphatic or cycloaliphatic vinyl or vinylidene monomers) or the functionalized derivatives thereof, as used herein means that the distribution of the monomers of said interpolymer can generally be described by the Bernoulli statistical model or by a first or second order Markovian statistical model, as described by J. C. Randall in *Polymer Sequence Determination, Carbon*-13 *NMR Method,* Academic Press, New York, 1977, pp. 71–78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The interpolymers suitable for functionalization according to the present invention include, but are not limited to interpolymers prepared by polymerizing ethylene and/or one or more α-olefins with one or more vinyl or vinylidene aromatic monomers and/or one or more sterically hindered aliphatic or cycloaliphatic vinyl or vinylidene monomers.

Suitable α-olefins include for example, α-olefins containing from about 3 to about 20, preferably from about 3 to about 12, more preferably from about 3 to about 8 carbon atoms. Particularly suitable are propylene, butene-1,4-methyl-1-pentene, hexene-1 and octene-1. Suitable α-olefins typically do not contain an aromatic moiety.

Suitable vinyl or vinylidene aromatic monomers which can be employed to prepare the interpolymers include, for example, those represented by the following formula:

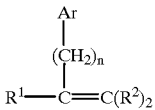

wherein R$^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; Ar is a phenyl group or a phenyl group substituted with from about 1 to about 5 substituents selected from the group consisting of halo, $C_{1-4}$-alkyl, and $C_{1-4}$-haloalkyl; and n has a value from zero to about 4, preferably from zero to about 2, most preferably zero. Exemplary vinyl aromatic monomers include styrene, vinyl toluene, α-methylstyrene, t-butyl styrene, chlorostyrene, including all isomers of these compounds. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic vinyl monomer is styrene.

By the term "sterically hindered aliphatic or cycloaliphatic vinyl or vinylidene compounds," it is meant addition polymerizable vinyl or vinylidene monomers such as those corresponding to the formula:

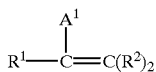

wherein $A^1$ is a sterically bulky, aliphatic or cycloaliphatic substituent of up to about 20 carbons, $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are vinylcyclohexane, and 1-, 3-, and 4-vinylcyclohexene. Olefin monomers containing from about 3 to about 20 carbon atoms and having a linear non-branched aliphatic structure such as propylene, butene-1, hexene-1 and octene-1 are not considered as hindered aliphatic monomers.

Other optional polymerizable etliylenically unsaturated monomer(s) include norbornene and $C_{1-10}$ alkyl or $C_{6-10}$ aryl substituted norbornenes, with an exemplary interpolymer being ethylene/styrene/norbornene.

The interpolymers of ethylene and/or one or more α-olefins and one or more vinyl or vinylidene aromatic monomers and/or one or more sterically hindered aliphatic or cycloaliphatic vinyl or vinylidene monomers employed in the present invention are substantially random polymers. These interpolymers usually contain from about 5 to about 65, preferably from about 5 to about 50, more preferably from about 10 to about 50 mole percent of one or more vinyl or vinylidene aromatic monomers and/or one or more hindered aliphatic or cycloaliphatic vinyl or vinylidene monomers and from about 35 to about 95, preferably from about 50 to about 95, more preferably from about 50 to about 90 mole percent of ethylene and/or at least one aliphatic α-olefin having from about 3 to about 20 carbon atoms.

While preparing the substantially random interpolymer, an amount of atactic vinyl or vinylidene aromatic homopolymer may be formed due to homopolymerization of the vinyl or vinylidene aromatic monomer at elevated temperatures. The presence of the vinyl or vinylidene aromatic homopolymer is in general not detrimental for the purposes of the present invention. The vinyl or vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than about 20 weight percent, preferably less than about 15 weight percent based on the total weight of the interpolymers of vinyl or vinylidene aromatic homopolymer be present.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens el al. and U.S. Pat. No. 5,703,187 by Francis J. Timmer, the contents of which are herein incorporated by reference.

Preferred operating conditions for such polymerization reactions are pressures from atmospheric up to about 3000 atmospheres and temperatures from about –30° C. to about 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. patent application Ser. No. 702,475, filed May 20, 1991 (EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 the entire contents of all of which are herein incorporated by reference.

The substantially random α-olefin/vinyl or vinylidene aromatic interpolymers can also be prepared by the methods described by John G. Bradfute et al (W. R. Grace & Co.) in WO 95/32095; by R. B. Pannell (Exxon Chemical Patents, Inc.) in WO 94/00500; and in *Plastics Technology,* p. 25, September, 1992, the contents of which are herein incorporated by reference.

Also suitable are the substantially random interpolymers which comprise at least one α-olefin/vinyl aromatic/vinyl aromatic/α-olefin tetrad disclosed in WO 98/09999, by Francis J. Timmers et al., the contents of which are herein incorporated by reference.

These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

In order to determine the carbon-13 NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris-(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer insertions preceded and followed by at least one α-olefin insertion, for example an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers are prepared by conducting the polymerization at temperatures of from about –30° C. to about 250° C. in the presence of such catalysts as those represented by the formula

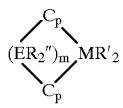

wherein: each Cp is independently, each occurrence, a substituted cyclopentadienyl group π-bound to M; E is C or Si; M is a group IV metal, preferably Zr or Hf, most preferably Zr; each R" is independently, each occurrence, H, hydrocarbyl, silahydrocarbyl, or hydrocarbylsilyl, containing up to 30 preferably from 1 to 20 more preferably from 1 to 10 carbon or silicon atoms; each R' is independently, each occurrence, H, halo, hydrocarbyl, hyrocarbyloxy, silahydrocarbyl, hydrocarbylsilyl containing up to 30 preferably from 1 to 20 more preferably from 1 to 10 carbon or silicon atoms or two R' groups together can be a $C_{1-20}$ hydrocarbyl mono- or poly-substituted 1,3-diene; m is 1 or 2; and optionally, but preferably in the presence of an activating cocatalyst. Particularly suitable substituted cyclopentadienyl groups include those illustrated by the formula:

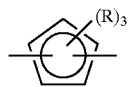

wherein each R in the formula is independently, each occurrence, H, hydrocarbyl, silahydrocarbyl, or hydrocarbylsilyl, containing up to 30 preferably from 1 to 20 more preferably from 1 to 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenyl indenyl) zirconium 1,4-diphenyl-1,3-butadiene, racemic (dimethylsilanediyl)-bis-(2-methyl-4-phenylindenyl) zirconium di-$C_{1-4}$ alkyl, racemic(dimethylsilanediyl)-bis-(2-methyl-4-phenylindenyl) zirconium di-$C_{1-4}$ alkoxide, or any combination thereof.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3,4,5-η)-1-indenyl)(tert-butyl amido)dimethylsilane titanium dimethyl, or any suitable combination thereof.

Further preparative methods for the interpolymer have been described in the literature. Longo and Grassi (*Makromol. Chem.*, 191:2387–2396, 1990), and D'Anniello et al. (*Journal of Applied Polymer Science*, 58:1701–1706, 1995) reported the use of a catalytic system based on methylalumoxane (MAO) and cyclopentadienyltitanium trichloride (CpTiCl$_3$) to prepare an ethylene-styrene copolymer. Xu and Lin (*Polymer Preprints, Am. Chem. Soc. Div. Polym. Chem.*), Vol. 35, pp. 686,687, 1994, have reported copolymerization using a MgCl$_2$/TiCl$_4$/NdCl$_3$/Al(iBu)$_3$ catalyst to give random copolymers of styrene and propylene. Lu et al. (*Journal of Applied Polymer Science*, 53:1453–1460, 1994, have described the copolymerization of ethylene and styrene using a TiCl$_4$/NdCl$_3$/MgCl$_2$/Al(Et)$_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652, 315 also issued to Mitsui Petrochemical Industries Ltd or as disclosed in DE 197 11 339 A1 to Denki Kagaku Kogyo KK, the contents of all of which are herein incorporated by reference.

The random copolymers of ethylene and styrene as disclosed in Polymer Preprints Vol 39, No. 1, March 1998 by Toru Aria et al. may also be employed as starting materials for the functionalized interpolymers of the present invention.

Once the α-olefin/vinyl aromatic monomer interpolymer has been prepared, the present invention involves functionalizing the interpolymer to prepare a substantially random interpolymer of the following repeating units in the indicated mole percent (%) quantities, (wherein the sum of a, b, c, and d is not greater than 100 mole percent); comprising (a) from 0 to about 64.95, preferably from 0 to about 55, more preferably from 0 to about 50 mole percent of repeating units represented by the following formula (I):

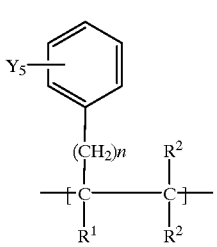

wherein Y is independently selected from the group consisting of hydrogen, substituted and unsubstituted alkyl radicals, benzyl radicals, aryl radicals, and aralkyl radicals containing up to 18 carbon atoms, —X, —CH$_2$X, —C(O)R$^6$, —(Z)—CO$_2$H, —(Z)—SO$_3$H, —NO$_2$, —C(O)OR$^6$, —(Z)—OR$^6$, —N(R$^6$)$_2$, —(Z)—N(R$^6$)$_2$, —P(OR$^6$)$_2$, —(Z)—P(OR$^6$)$_2$, —P(R$^6$)$_2$, —(Z)—P(R$^6$)$_2$, —P(O)(R$^6$)$_2$, —(Z)—P(O)(R$^6$)$_2$, —P(O)(OR$^6$)$_2$, —(Z)—P(O)(R$^6$)$_2$, —(Z)-SR$^6$, —CN, —(Z)—CN, —CO$_2$H, —C(O)N(R$^6$)$_2$, —(Z)—C(O)N(R$^6$)$_2$, ionomeric salts of —CO$_2$$^-$, —(Z)—CO$_2$$^-$, —(Z)—SO$_3$$^-$, —N$^+$(R$^6$)$_3$, —(Z)—N$^+$(R$^6$)$_3$, —P$^+$(R$^6$)$_3$, —(Z)—P$^+$(R$^6$)$_3$, —(Z)—S$^+$(R$^6$)$_2$, and mixtures thereof; R$^1$ is selected from the group of radicals consisting of hydrogen and alkyl radicals containing from about 1 to about 4 carbon atoms; R$^2$ is independently selected from the group of radicals consisting of hydrogen and alkyl radicals containing from about 1 to about 4 carbon atoms; R$^6$ is independently selected from the group of radicals consisting of hydrogen, substituted or unsubstituted alkyl radicals containing from about 1 to about 18 carbon atoms, and substituted or unsubstituted aryl radicals; X is a halogen; and Z is alkylene or arylene; and n has a value from zero to about 4; R$^1$ is selected from the group of radicals consisting of hydrogen and alkyl radicals containing from about 1 to about 4 carbon atoms, preferably hydrogen or methyl, most preferably hydrogen; R$^2$ is independently selected from the group of radicals consisting of hydrogen and alkyl radicals containing from about 1 to about 4 carbon atoms, preferably hydrogen or methyl, most preferably hydrogen; R$^6$ is independently selected from the group of radicals consisting of hydrogen, substituted or unsubstituted alkyl radicals containing from about 1 to about 18 carbon atoms, and substituted or unsubstituted aryl radicals, preferably hydrogen or phenyl or substituted or unsubstituted alkyl radicals containing from about 1 to about 12 carbon atoms, most preferably hydrogen or phenyl or substituted or unsubstituted alkyl radicals containing from about 1 to about 6 carbon atoms; X is a halogen, preferably chlorine; and Z is arylene or a C$_1$ to C$_4$ alkylene, preferably phenylene, or methylene;

(b) from about 0.05 to about 65, preferably from about 0.1 to about 55, more preferably from about 0.5 to about 50 mole percent of repeating units represented by the following formula (II);

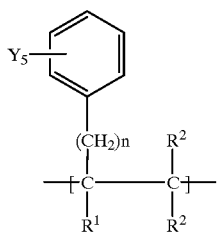

(II)

wherein Y, R$^1$, R$^2$, n, and X are as described for I with the proviso that at least one Y is not hydrogen;

(c) from 0 to about 25, preferably from 0 to about 15, more preferably from 0 to about 5 mole percent of repeating units represented by the following formula (III);

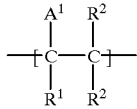

(III)

wherein R$^1$ and R$^2$ are as described for I and A$^1$ is a sterically bulky, aliphatic or cycloaliphatic substituent of up to about 20 carbons or R$^2$ and A$^1$ together form a ring system wherein the ring system formed by A$^1$ and R$^2$ is optionally substituted with one or more substituents selected from substituted and unsubstituted alkyl radicals benzyl radicals, aryl radicals, and aralkyl radicals containing up to about 18 carbon atoms, —X, —CH$_2$X, —C(O)R$^6$, —(Z)—CO$_2$H, —(Z)—SO$_3$H, —NO$_2$, —C(O)OR$^6$, —(Z)—OR$^6$, —N(R$^6$)$_2$, —(Z)—N(R$^6$)$_2$, —P(OR$^6$)$_2$, —(Z)—P(OR$^6$)$_2$, —P(R$^6$)$_2$, —(Z)—P(R$^6$)$_2$, —P(O)(R$^6$)$_2$, —(Z)—P(O)(R$^6$)$_2$, —P(O)(OR$^6$)$_2$, —(Z)—P(O)(R$^6$)$_2$, —(Z)—SR$^6$, —CN, —(Z)—CN, —CO$_2$H, —C(O)N(R$^6$)$_2$, —(Z)—C(O)N(R$^6$)$_2$, ionomeric salts of —CO$_2$$^-$, —(Z)—CO$_2$$^-$, —(Z)—SO$_3$$^-$, —N$^+$(R$^6$)$_3$, —(Z)—N$^+$(R$^6$)$_3$, —P$^+$(R$^6$)$_3$, —(Z)—P$^+$(R$^6$)$_3$, —(Z)—S$^+$(R$^6$)$_2$, and mixtures thereof; wherein R$^6$, X, and Z are as defined above for I; and (d) from 35 to 99.95 mole percent of repeating units represented by the following formula (IV);

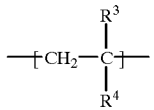

(IV)

wherein R$^3$ and R$^4$ are selected from the group consisting of hydrogen and alkyl radicals having from 1 to 18 carbon atoms, with the proviso that R$^3$ and R$^4$ are different alkyl radicals.

The terms "ester", "ether", "amine", "amide", for example include both substituted and unsubstituted alkyl and aryl derivatives thereof.

The functionalized, that is, transformed, interpolymers described above may be prepared in a number of different ways depending upon the interpolymer starting material and the number and type of functional groups to be added. Some functional groups may be added directly to the interpolymer by, for example, a Friedel-Crafts reaction or other electrophilic substitution reaction. Such functional groups include, for example, unsubstituted or substituted alkylcarbonyl, arylcarbonyl, and aralkyl groups; carboxylic acid or sulfonic acid groups or alkyl groups substituted with carboxylic acid or sulfonic acid groups; halogen, and NO$_2$, which can subsequently be transformed to NH$_2$. Preferably such groups include acyl such as substituted or unsubstituted phenylcarbonyl, carboxyalkylcarbonyl, and substituted or unsubstituted carboxybenzyl. Particularly preferred groups include —C(O)Me which can be further functionalized to, for example, —CO$_2$H; —C(O)—pC$_6$H$_4$—Me which in turn can be further functionalized to, for example, —CH(OH)—pC$_6$H$_4$—Me;, for example, —CH(R$^5$)CH$_2$CH$_2$CO$_2$H; —CH(R$^5$)CH$_2$CH$_2$SO$_3$H; and —CH(R$^5$)—pC$_6$H$_4$—CO$_2$H, wherein R$^5$ is independantly selected from hydrogen or an alkyl group; and —C(O)CH$_2$CH$_2$CO$_2$H. The functional groups containing acid groups can be converted to ionomeric salts, such as zinc ionomers by neutralization. The electrophilic substitution reactions which have been discovered to be advantageously useful for the substantially random polymers described above may be conducted as described in G. A. Olah, *Friedel-Crafts and Related Reactions,* Vol. II, Part 2, J. Wiley & Sons, N.Y., 1964.

While many of the earlier described substituents may be placed directly on the interpolymer by an electrophilic substitution reaction, other substituents are not amenable to this strategy. For this reason it is often advantageous to first halomethylate the interpolymer and then transform the halomethyl group into other substituents by suitable reactions, such as nucleophilic substitution.

Such halomethylation typically employs the dissolution of the interpolymer in a suitable solvent to perform halomethylation. Generally, a suitable solvent is a compound which will not significantly react with any component in the reaction mixture. Preferably, the solvent is a liquid and remains a liquid at the conditions employed in the reaction. While different types of solvents may be used, preferred solvents include, for example, chlorinated hydrocarbons such as 1,2-dichloroethane, trichlorornethane, methylene chloride, as well as, mixtures thereof. Often, the halomethyl ether reactant itself may be used in excess as a solvent.

Once dissolved, the interpolymer is then reacted with a halomethyl ether having the following structure:

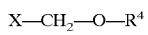

$$X-CH_2-O-R^4$$

wherein X represents a halogen and $R^4$ represents an inert group.

X is preferably chloro, bromo, fluoro, or iodo. More preferably X is chloro or bromo. Most preferably X is chloro.

The $R^4$ group is not particularly critical so long as the halomethyl ether is capable of reacting with the interpolymer to form a halomethylated interpolymer. Thus, $R^4$ is an inert group with respect to the reactants and reaction conditions employed. Typically, $R^4$ is a group selected from substituted or unsubstituted hydrocarbyl. Preferably $R^4$ is an alkyl group. More preferably $R^4$ is an alkyl group having from one to 20 carbon atoms. Most preferably $R^4$ is an alkyl group having from one to six carbon atoms such as, for example, methyl or ethyl.

The specific halomethyl ether which is employed in the halomethylation reaction is generally selected based upon the halomethylated interpolymer which is desired. For example, if a chloromethylated interpolymer is desired then a chloromethyl ether is employed. Similarly, if a bromomethylated interpolymer is desired then a bromomethyl ether is employed. Preferred halomethyl ethers include halomethyl alkyl ethers such as chloromethyl alkyl ethers and bromomethyl alkyl ethers, for example, chloromethyl methyl ether, chloromethyl ethyl ether, bromomethyl methyl ether, bromomethyl ethyl ether.

The halomethyl ether is preferably mixed with the dissolved interpolymer. However, as one skilled in the art will appreciate, the halomethyl ether may also first be dissolved in a suitable solvent and then the interpolymer may be dissolved in the same or a different solvent. Additionally, the halomethyl ether may be formed in situ.

The amount of halomethyl ether employed varies depending upon such factors as the type of interpolymer, the desired degree of halomethylation and the reaction conditions employed. Typically, the higher the desired degree of halomethylation then the more halomethyl ether which is required.

The degree of halomethylation may be defined as the mole percent of halomethylation per mole of polymer repeat unit containing an aromatic group. In the case of ethylene-styrene interpolymer for example, the degree of halomethylation is the mole percent of phenyl rings which have a halomethyl group attached. For ethylene-styrene interpolymers the mole percent may be from at least 1, preferably at least 5 to 80 percent or even as much as 100 or 200 percent. As one skilled in the art will appreciate if the degree of halomethylation is above 100 percent then some aromatic groups will have more than one halomethyl group substituent.

Generally, the para position of the phenyl ring is most active and the meta position is the least active. Thus, halomethyl substitution first occurs predominantly at the para position of the ethylene-styrene interpolymer and then at the ortho position. Both the degree of halomethylation and the position of substitution may be readily determined by NMR spectroscopy.

The interpolymer is preferably reacted with the halomethyl ether in the presence of a catalytic amount of a suitable catalyst. A suitable catalyst is a compound which is effective in catalyzing chloromethylation as described in, for example, G. A. Olah, *Friedel-Crafts and Related Reactions,* Vol. 11, Part 2, p. 659, J. Wiley & Sons, N.Y., 1964. Preferably, such catalysts include mild Lewis acid catalysts such as tin tetrachloride, zinc chloride, and titanium tetrachloride.

The specific catalyst employed is not critical so long as the catalyst has the appropriate activity. As one skilled in the art will appreciate, the higher the desired degree of halomethylation then the more active a catalyst which may be necessary. In some circumstances the catalyst may be so active that crosslinking and/or gellation of the interpolymer may occur. If crosslinking is not desired then a moderating agent may be added in a sufficient amount to weaken the catalyst activity and reduce the crosslinking. Such moderating agents are compounds such as, for example, ethers. Thus, ethers such as alkyl ethers, aromatic ethers and mixtures thereof will often moderate the catalyst activity. A preferred ether which has shown effectiveness as a moderating agent is diethyl ether.

The amount of catalyst added will vary depending upon such factors as the particular catalyst employed, the type and amount of interpolymer and halomethyl ether being reacted, as well as, the desired degree of halomethylation. In general, however, the molar ratio of halomethyl ether to catalyst often determines the degree of halomethylation, as well as, the amount of crosslinking which occurs. Therefore, for most applications the molar ratio of halomethyl ether to catalyst is usually at least 5, preferably at least 10, more preferably at least 20. On the other hand, the molar ratio of halomethyl ether to catalyst is usually no more than 1000, preferably no more than 100, more preferably no more than 50.

The pressure and temperature of the halomethylation reaction should be regulated such that the reaction proceeds as desired. Typically, the reaction is carried out at ambient pressure. However, other pressures may be employed so long as the reaction is not hindered.

Many differerent temperatures may be employed. Typically, if the temperature is low then the reaction proceeds slowly. On the other hand, if the temperature is high then the reaction proceeds more quickly and may even result in crosslinking. In general, temperatures of at least −50, preferably at least 0, more preferably at least 10° C. may be employed. Correspondingly, temperatures of less than 100, preferably less than 50, more preferably less than 30° C. may be employed.

The reaction should be allowed to proceed until the desired degree of halomethylation has been reached. As one skilled in the art will appreciate, such times will vary depending upon the desired degree of halomethylation, as well as, the particular catalyst employed and the reaction conditions. Typically, higher degrees of halomethylation will require a longer reaction time. However, generally reaction times may be reduced by employing more halomethylating agent and/or more active catalysts and/or higher temperatures. Generally, the reaction time is at least 0.5, preferably at least 2, more preferably at least 8 hours. Correspondingly, the reaction time is usually less than 72, preferably less than 48, more preferably less than 24 hours.

The halomethylated interpolymer may be recovered by any suitable means. A particularly advantageous recovery method is to add a quenching amount of water when the desired degree of halomethylation has been reached. The water which is added is preferably at a temperature below that of the reaction and above the water's freezing point at the pressure employed in the reaction.

The actual amount and temperature of the water which is added is not critical so long as the reaction is quenched and a readily separable aqueous layer and an organic layer are formed. The organic layer comprises halomethylated interpolymer and solvent. The two layers may be separated and the halomethylated interpolymer may then be isolated from the organic layer and dried. While the isolation may be accomplished by any suitable means, a convenient means of isolation is precipitation.

The properties of the halomethylated resins usually differ widely depending upon the type of halogen, the type of interpolymer, and the extent of halomethylation. Generally, chloromethylation appears to have little effect on the glass transition temperature and the thermal stability of ethylene-styrene interpolymer. For example, the glass transition temperature of ethylene styrene copolymer containing 70 weight percent styrene increases from 26.5° C. to 29° C. when 44 mole percent of the phenyl groups are chloromethylated and the thermal stability appears comparable to that of the parent interpolymer.

Once the interpolymer has been halomethylated, the halomethyl groups may be transformed to other functional groups if desired. The transformation may occur in solution or in an interpolymer melt in, for example, an extruder. Numerous transformations are possible. For example, the halomethyl group can be used for simple crosslinking (by reaction with a Lewis acid, a dinucleophile or water or induced by radiation), reactive compatibilization with other polymers, or for introduction of a plethora of other functional groups onto the polymer backbone. Functional groups to which the halomethyl group can be transformed include, for example, phosplhonium, ammonium, sulfonium, ester, hydroxyl, ether, amine, phosphine, thiol, cyano, carboxylic acid, amide, or a functional group derived from reaction with nucleophiles, and mixtures thereof within the interpolymer. Such functionalization from halomethyl groups has been described in, for example, U.S. Pat. No. 5,162,445; P. Hodge, "Polymers as Chemical Reagents", *Encyclonedia of Polymer Science and Engineering 2nd Edition,* pp. 618–658; and Monthead et al., "Chemical Transformations of Chloromethylated Polystyrene," *IMS-Review Macromolecular Chemical Physics,* 1988, pp. 503–592. Suitable such methods may be used to form the transformed interpolymers. Some examples of such functionalization are described below.

The transformed, that is, functionalized, interpolymers of the present invention are preferably substantially random interpolymers comprising repeating units derived from
(1) monomer units derived from
  (i) at least one vinyl or vinylidene aromatic monomer, or
  (ii) at least one sterically hindered aliphatic or cycloaliphatic vinyl or vinylidene monomer;
  (iii) a combination of at least one vinyl or vinylidene aromatic monomer and at least one sterically hindered aliphatic or cycloatiphatic vinyl or vinylidene monomer; and
(2) monomer units derived from
  (i) ethylene, or
  (ii) $C_{3-20}$ α-olefin;
  (iii) or a combination (i) and (ii)
  wherein the aromatic group of one or more of said vinyl or vinylidene aromatic monomers is substituted subsequent to interpolymer formation with one or more substituents independently selected from the group consisting of substituted and unsubstituted alkyl radicals, benzyl radicals, aryl radicals, and aralkyl radicals containing up to 18 carbon atoms, $—X$, $—CH_2X$, $—C(O)R^6$, $—(Z)—CO_2H$, $—(Z)—SO_3H$, $—NO_2$, $—C(O)OR^6$, $—(Z)—OR^6$, $—N(R^6)_2$, $—(Z)—N(R^6)_2$, $—P(OR^6)_2$, $—(Z)—P(OR^6)_2$, $—P(R^6)_2$, $—(Z)—P(R^6)_2$, $—P(O)(R^6)_2$, $—(Z)—P(O)(R^6)_2$, $—P(O)(OR^6)_2$, $—(Z)—P(O)(R^6)_2$, $—(Z)—SR^6$, $—CN$, $—(Z)—CN$, $—CO_2H$, $—C(O)N(R^6)_2$, $—(Z)—C(O)N(R^6)_2$, ionomeric salts of $—CO_2^-$, $—(Z)—CO_2^-$, $—(Z)—SO_3^-$, $—N^+(R^6)_3$, $—(Z)—N^+(R^6)_3$, $—P^+(R^6)_3$, $—(Z)—P^+(R^6)_3$, $—(Z)—S^+(R^6)_2$, and mixtures thereof, where $R^1$ is selected from the group of radicals consisting of hydrogen and alkyl radicals containing from 1 to 4 carbon atoms; $R^2$ is independently selected from the group of radicals consisting of hydrogen and alkyl radicals containing from 1 to 4 carbon atoms; $R^6$ is independently selected from the group of radicals consisting of hydrogen, substituted or unsubstituted alkyl radicals containing from 1 to 18 carbon atoms, and substituted or unsubstituted aryl radicals; X is a halogen; and Z is alkylene or arylene; and n has a value from zero to 4.

The phrase "substituted subsequent to interpolymer formation" as used herein means that an substantially random interpolymer is ffirst formed and is then reacted to form a functionalized substantially random interpolymer.

Preferred functional groups include, for example, chloromethyl, bromomethyl, trialkyl ammonium such as triethyl ammonium, alkyl phosphonium, aryl phosphonium such as triphenyl phosphonium, acetate, hydroxyl, methoxy, phenoxy, cyano, alkylcarbonyl, arylcarbonyl, and metal ionomers. It is preferred that when Component (1) is styrene, and Component 2 is ethylene, Component (1) is not substituted, subsequent to functionalization, at the para position with a group having a formula $—CF(R^7)_2$ wherein R7 is hydrogen or alkyl. It is also preferred that Component (1) is not a para $C_1–C_4$-alkyl styrene when Component (2) is a $C_4–C_7$ isoloefin.

The substantially random functionalized interpolymers and compositions of the present invention can be utilized as a component in polymer blends such as a compatabilizer and can be used to produce a wide range of fabricated articles, including but not limited to, calendered sheet, blown films, injection molded parts. The compositions can also be used in the manufacture of fibers, foams and lattices. The compositions of the present invention can also be utilized in adhesive and sealant formulations. Some properties which might be desirable to modify include, for example, processing characteristics, glass transition temperature, modulus, hardness, viscosity, elongation, fire retardation, use of functionalized polymers in membranes, as components in bitumen/asphalt modification, in wire and cable, in flooring/carpet systems, and as tie layers in multilayer film structures, as coupling agents in filled polymer compositions (including their use as minor components in ESI and other polymer compositions. The functionalization can be performed on the resin itself or on a surface layer of a pre-formed structure comprising the unfunctionalized substantially random interpolymer which in turn can have major effects on properties such as for example, friction, blocking, and adhesion.

The following examples are illustrative of the invention, but are not to be construed as limiting the scope of the invention in any manner.

EXAMPLES

Preparation of Ethylene Styrene Interpolymers (ESI-1, ESI-2 and ESI-3)

ESI's-1–3 were substantially random ethylene/styrene interpolymers prepared using the following catalyst and polymerization procedures.

Preparation of Catalyst A (dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium)

1) Preparation of 3,5,6,7-Tetrahydro-s-Hydrindacen-1(2H)-one

Indan (94.00 g, 0.7954 moles) and 3-chloropropionyl chloride (100.99 g, 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield).

$^1$H NMR ($CDCl_3$): d2.04–2.19 (m, 2H), 2.65 (t, $^3J_{HH}$=5.7 Hz, 2H), 2.84–3.0 (m, 4H) 3.03 (t, $^3J_{HH}$=5.5 Hz, 2H), 7.26 (s, 1H), 7.53 (s, 1H).

$^{13}$C NMR ($CDCl_3$): d25.71, 26.01, 32.19, 33.24, 36.93, 118.90, 122.16, 135.88, 144.06, 152.89, 154.36, 206.50.

GC-MS: Calculated for $C_{12}H_{12}O$ 172.09, found 172.05.

2) Preparation of 1,2,3,5-Tetrahydro-7-phenyl-s-indacen 3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$ (2×100 mL) and then dried over $MgSO_4$. Filtration followed by the removal of the volatiles resulted in the isolation of the desired product as a dark oil (14.68 g, 90.3% yield).

$^1$H NMR ($CDCl_3$): d2.0–2.2 (m, 2H), 2.8–3.1 (m, 4H), 6.54 (s, 1H), 7.2–7.6 (m, 7H).

GC-MS: Calculated for $C_{18}H_{16}$ 232.13, found 232.05.

3) Preparation of 1,2,3,5-Tetrahydro-7-phenyl-s-indacene, dilithium salt 1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

4) Preparation of Chlorodimethyl(1,5,6,7-tetrahydro-3-phenyl-s-indacen-1-yl)silane 1,2,3,5-Tetrahydro-7-phenyl-s-indacene, dilithium salt (12.2075 g, 0.05102 moles) in THF (50 mL) was added dropwise to a solution of $Me_2SiCl_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1 % yield).

$^1$H NMR ($CDCl_3$): d0.33 (s, 3H), 0.38 (s, 3H), 2.20 (p, $^3J_{HH}$=7.5 Hz, 2H), 2.9–3.1 (m, 4H), 3.84 (s, 1H), 6.69 (d, $^3J_{HH}$=2.8 Hz, 1H), 7.3–7.6 (m, 7H), 7.68 (d, $^3J_{HH}$=7.4 Hz, 2H).

$^{13}$C NMR ($CDCl_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62.

GC-MS: Calculated for $C_{20}H_{21}ClSi$ 324.11, found 324.05.

5) Preparation of N-(1,1-Dimethylethyl)-1,1-dimethyl-1-(1,5,6,7-tetrahydro-3-phenyl-s-indacen-1-yl)silanamine Chlorodimethyl(1,5,6,7-tetrahydro-3-phenyl-s-indacen-1-yl)silane (10.8277 g, 0.03322 moles) was stirred in hexane (150 mL) as $NEt_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield).

$^1$H NMR ($CDCl_3$): d0.02 (s, 3H), 0.04 (s, 3H), 1.27 (s, 9H), 2.16 (p, $^3J_{HH}$=7.2 Hz, 2H), 2.9–3.0 (m, 4H), 3.68 (s, 1H), 6.69 (s, 1H), 7.3–7.5 (m, 4H), 7.63 (d, $^3J_{HH}$=7.4 Hz, 2H).

$^{13}$C NMR ($CDCl_3$): d–0.32, –0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

6) Preparation of N-(1,1-Dimethylethyl)-1,1-dimethyl-1-(1,5,6,7-tetrahydro-3-phenyl-s-indacen-1-yl) silanamine, dilithium salt N-(1,1-Dimethylethyl)-1,1-dimethyl-1-(1,5,6,7-tetrahydro-3-phenyl-s-indacen-1yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

7) Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of $TiCl_3(THF)_3$ (4.5005 g, 0.01214 moles) in THF (100 mL). This mixture was allowed to stir for 2 hours. $PbCl_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5% yield).

$^1H$ NMR ($CDCl_3$): d0.71 (s, 3H), 0.97 (s, 3H), 1.37 (s, 9H), 2.0–2.2 (m, 2H), 2.9–3.2 (m, 4H), 6.62 (s, 1H), 7.35–7.45 (m, 1H), 7.50 (t, $^3J_{HH}$=7.8 Hz, 2H), 7.57 (s, 1H), 7.70 (d, $^3J_{HH}$=7.1 Hz, 2H), 7.78 (s, 1H).

$^1H$ NMR ($C_6D_6$): d0.44 (s, 3H), 0.68 (s, 3H), 1.35 (s, 9H), 1.6–1.9 (m, 2H), 2.5–3.9 (m, 4H), 6.65 (s, 1H), 7.1–7.2 (m, 1H), 7.24 (t, $^3J_{HH}$=7.1 Hz, 2H), 7.61 (s, 1H), 7.69 (s, 1 H), 7.77–7.8 (m, 2H).

$^{13}C$ NMR ($CDCl_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93.

$^{13}C$ NMR ($C_6D_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-η)-1,5,6,7-tetrahydro-3-phenyl-s-indacen-1-yl] silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1H$ NMR ($C_6D_6$): d0.071 (s, 3H), 0.49 (s, 3H), 0.70 (s, 3H), 0.73 (s, 3H), 1.49 (s, 9H), 1.7–1.8 (m, 2H), 2.5–2.8 (m, 4H), 6.41 (s, 1H), 7.29 (t, $^3J_{HH}$=7.4 Hz, 2H), 7.48 (s, 1H), 7.72 (d, $^3J_{HH}$=7.4 Hz, 2H), 7.92 (s, 1H). $^{13}C$ NMR ($C_6D_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Preparation of Cocatalyst E, (Bis(hydroyenated-tallowalkyl) methylamine

Methylcyclohexane (1200 mL) was placed in a 2L cylindrical flask. While stirring, bis(hydrogenated-tallowalkyl) methylamine (ARMEENO® M2HT, 104 g, ground to a granular form) was added to the flask and stirred until completely dissolved. Aqueous HCl (1M, 200 mL) was added to the flask, and the mixture was stirred for 30 minutes. A white precipitate formed immediately. At the end of this time, $LiB(C_6F_5)_4 \cdot Et_2O \cdot 3$ LiCl (Mw=887.3; 177.4 g) was added to the flask. The solution began to turn milky white. The flask was equipped with a 6" Vigreux column topped with a distillation apparatus and the mixture was heated (140 ° C. external wall temperature). A mixture of ether and methylcyclohexane was distilled from the flask. The two-phase solution was now only slightly hazy. The mixture was allowed to cool to room temperature, and the contents were placed in a 4 L separatory funnel. The aqueous layer was removed and discarded, and the organic layer was washed twice with $H_2O$ and the aqueous layers again discarded. The $H_2O$ saturated methylcyclohexane solutions were measured to contain 0.48 wt percent diethyl ether ($Et_2O$).

The solution (600 mL) was transferred into a 1 L flask, sparged thoroughly with nitrogen, and transferred into the drybox. The solution was passed through a column (1" diameter, 6" height) containing 13× molecular sieves. This reduced the level of $Et_2O$ from 0.48 wt percent to 0.28 wt percent. The material was then stirred over fresh 13× sieves (20 g) for four hours. The $Et_2O$ level was then measured to be 0.19 wt percent. The mixture was then stirred overnight, resulting in a further reduction in $Et_2O$ level to approximately 40 ppm. The mixture was filtered using a funnel equipped with a glass frit having a pore size of 10–15 $\mu$m to give a clear solution (the molecular sieves were rinsed with additional dry methylcyclohexane). The concentration was measured by gravimetric analysis yielding a value of 16.7 wt percent.

Polymerization

ESI-1 was prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/ hr)). These flows were measured by differential pressure flow meters and controlled by manual adjustment of micro-flow needle valves.

Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream.

This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

The various catalysts, co-catalysts and process conditions used to prepare the ethylene styrene interpolymer are summarized in Table 1 and its properties are summarized in Table 2.

rimetry (DSC) was performed on a Dupont DSC 2910 scanning at 10° C./min. The glass transition temperatures reported are the inflections of the step transitions. Inherent viscosities were measured with a Schott Gerate Capillary Viscometer in chloroform at 25° C. at concentration of 0.5 g/dL.

NMR Analysis

The chloromethylated polymer (100 mg) was dissolved in 2 g of $CDCl_3$ and then placed in a 5 mm diameter NMR tube. Standard proton and carbon spectra were then run. The extent of chloromethylation was calculated from the integrated proton NMR spectrum. The integral of the benzylic methylene hydrogens of the chloromethyl group (4.53 ppm) and the integral of the total aromatic region (6.6–7.6 ppm) were used in the calculation. The calculation was performed as follows:

Let i'=number of chloromethylated phenyl groups

Let i=number of unsubstituted phenyl groups

Then, 2i'=integral of methylene hydrogens of chloromethyl group and 5i+4i'=total integral of aromatic region, and i'/(i'+i)=mole fraction of phenyl groups chloromethylated=z.

For the purposes of this application, the mol % of total functionalized repeating units, "x", was determined from the mole fraction of phenyl groups functionalized, "z", using the following equation:

TABLE 1

PREPARATION CONDITIONS FOR ESI #'S 1–3

| ESI # | Reactor Temp ° C. | Solvent Flow lb/hr (kg/hr) | Ethylene Flow lb/hr (kg/hr) | Hydrogen Flow sccm[f] | Styrene Flow lb/hr (kg/hr) | Ethylene Conversion % | B/Ti Ratio | MMAO[e]/Ti Ratio | Catalyst | Co-Catalyst |
|---|---|---|---|---|---|---|---|---|---|---|
| ESI-1 | 78.4 | 40.99 (18.59) | 2.17 (0.98) | 3.5 | 21.0 (9.52) | 96.42 | 3.5 | 6.0 | A[a] | C[c] |
| ESI-2 | 101.8 | 19.20 (8.71) | 1.99 (0.90) | 4.0 | 7.0 (3.16) | 87.38 | 1.25 | 10.0 | B[b] | D[d] |
| ESI-3 | 80.2 | 18.57 (8.42) | 1.71 (0.77) | 12.0 | 12.0 (5.42) | 88.93 | 1.25 | 10.0 | A[a] | D[d] |

[a]Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium.
[b]Catalyst B is (t-butylamido)dimethyl(tetramethylcyclopentadienyl)silane-titanium (II) 1,3-pentadiene prepared as described in U.S. Pat. No. 5,556,928, Example 17
[c]Cocatalyst C is tris(pentafluorophenyl)borane, (CAS #001109-15-5),.
[d]Cocatalyst D is bis-hydrogenated tallowalkyl methylammonium tetrakis (pentafluorophenyl)borate.
[e]a modified methylaluminoxane available from Akzo Nobel as MMAO-3A (CAS #146905-79-5)
[f]SCCM is standard $cm^3$/min

TABLE 2

PROPERTIES OF ESI #'S 1–3

| ESI # | Styrene[a] (wt %) | Styrene[a] (mol %) | Atactic Polystyrene[b] (wt %) | Melt Index, $I_2$ (g/10 min) |
|---|---|---|---|---|
| ESI-1 | 70.0 | 38.6 | 3 | 1.26 |
| ESI-2 | 35.0 | 12.7 | 6.0 | — |
| ESI-3 | 58.0 | 27.1 | 3.0 | 1.0 |

[a]the amount of styrene in the copolymer.
[b]Based on the copolymer plus the atactic polystyrene content Apparatuses Proton (300 MHz) and Carbon (75 MHz) nuclear magnetic resonance (NMR) spectra were run in deuterochloroform and referenced to tetramethylsilane (0 ppm). The NMR instrument was a Varian Inova. Differential Scanning Calox=100 z a/c where;

"z" is the mole fraction of phenyl groups functionalized (as determined by NMR);

"a" is the no. of moles of styrene repeat units in 100 g of the starting interpolymer as calculated by a=100 y/104.15 (where y is the wt fraction of styrene repeat units in the starting interpolymer and 104.15 is the molecular weight of styrene.);

"b" is the no. of moles of ethylene repeat units in 100 g of the starting interpolymer as calculated by b=100 (1−y)/28.05 (where y is the wt fraction of styrene repeat units in the starting interpolymer and 28.05 is the molecular weight of ethylene.) and "c"=a+b The ESI samples contained no talc, calcium stearate or any other additive or stabilizer. ESI-1 had a melt index (MI)

of 1.26 g/10 minutes at 190° C. under a 2.1 kg load and an inherent viscosity of 1.16 dL/g in CHCl$_3$ at a concentration of 0.5 g/dL and a temperature of 25° C. The glass transition temperature of ESI-1 was 26.5° C. (inflection of the step transition, scan rate=10° C./minute).

Example 1

Chloromehtylation of ESI-1

A 1L 3 neck flask equipped with mechanical stirrer, water condenser, and nitrogen inlet was charged with 62.5 g (0.42 mols styrene repeat units) of ESI-1 and 500 mL of methylene chloride. After complete dissolution of the interpolymer (~3 hrs), 2.25 mL (2.25 mmol) of a 1 molar solution of zinc chloride in diethyl ether was added to the flask and the reaction mixture became hazy. Next, 5.0 g (52.9 mmol) of chloromethyl ethyl ether was added all at once. The reaction mixture cleared and took on a light yellow color. The reaction was stirred at ambient temperature for 30 hours and then 200 mL of water was added to quench the reaction mixture. After stirring vigorously for 5 minutes the contents of the flask were transferred to a separatory funnel and the layers allowed to separate (~2 hrs). The methylene chloride layer containing the interpolymer was then passed through a column (radius=3.6 cm) containing 300 mL of MSC-1H strong acid ion exchange beads to remove the last traces of zinc and water. The chloromethylated intelpolymer was precipitated into 4 L of 50/50 v/v acetone/methanol in explosion proof Waring blender and then collected by filtration and dried in a vacuum oven. The final yield of chloromethylated interpolymer was 49.6 g. Analysis of the sample by proton NMR (CDCl$_3$) revealed a new peak at 4.53 (relative to tetramethylsilane) due to the chloromethyl group. Integration of the proton NMR spectrum showed that 1.6% of the phenyl groups bear the chloromethyl group corresponding to 0.62 mol % of functionalized repeating units. The dilute solution viscosity of the interpolymer in chloroform (~0.5 g/dL, 25° C.) was 1.26 dL/g.

Example 2

Chloromethylation of ESI-1

A 2L, 4 neck flask equipped with mechanical stirrer, water condenser, and nitrogen inlet was charged with 125 g (0.84 mol styrene) of ESI-1 interpolymer and 1 L of metlhylene chloride. After complete dissolution of the interpolymer (~3 hrs), 4.5 mL (4.5 mmol) of a 1 molar solution of zinc chloride in diethyl ether was added to the flask. The reaction mixture became hazy upon addition of the catalyst solution. Next, 10.0 g (0.106 mol) of chloromethyl ethyl ether was added all at once. The reaction mixture cleared and took on a light yellow color. The reaction was stirred at ambient temperature for 30 hours and then 400 mL of water was added to quench the reaction. After stirring vigorously for 5 minutes the contents of the flask were transferred to a separatory funnel and the layers allowed to separate (~2 hrs). The methylene chloride layer containing the interpolymer was then passed through a column (radius=3.6 cm) containing 200 mL of Dowex MSC-1H™ strong acid ion exchange resin to remove the last traces of zinc and water (the ion exchange resin was rinsed with water, tetrahydrofuran, and finally methylene chloride prior to use). The chloromethylated interpolymer solution was divided into approximately two equal portions and each portion was precipitated into 3.2 L of 50/50, v/v, acetone/methanol in an explosion proof Waring™ blender and then collected by filtration on a glass fritted funnel. The white interpolymer was rinsed with methanol, air dried on the funnel and then dried in a vacuum oven at 30° C. The final isolated yield of interpolymer was 115.3 g. Analysis of the sample by proton NMR (CDCl$_3$) revealed a new peak at 4.53 ppm (relative to tetramethylsilane) due to the chloromethyl group. Integration of the proton NMR spectrum showed that 2.1 mole percent of the phenyl groups bear the chloromethyl group corresponding to 0.81 mol % of functionalized repeating units. This level of chloromethylation corresponds to 0.14 mmol of CH$_2$Cl groups/g of interpolymer. The dilute solution viscosity of the chloromethylated interpolymer in chloroform (~0.5 g/dL, 25° C.) was 1.26 dL/g and it had a glass transition temperature of 23.0° C.

Example 3

Bromomethylation of ESI-1

A 120 mL wide mouth bottle was charged with 6.25 g (42 mmol of styrene) of ESI-1, 50 mL of methylene chloride. The bottle was capped with a teflon lined lid and placed on a shaker overnight to dissolve the interpolymer. After the interpolymer had dissolved 0.9 mL (0.9 mmol) of tin(IV) bromide (1 molar solution in CH$_2$Cl$_2$) was added to the bottle via a syringe and mixed with the interpolymer solution. Next, 5 mL of diethyl ether and 2.25 g (10.1 mmol) of bromomethyloctyl ether were added to the bottle. The bottle was then placed on a shaker. After 8 hours, an aliquot of the reaction mixture was removed and precipitated into methanol. The sample was then dried in a vacuum oven at ambient temperature and then analyzed by proton NMR to reveal that 0.32 mole percent of the phenyl groups had been bromomethylated. After 31 hours, the remaining reaction mixture was precipitated into an explosion proof Waring™ blender containing 500 mL of 50/50, v/v, methanol/acetone. The bromomethylated interpolymer was collected by filtration on a glass fritted funnel and was washed with an additional 50 mL of methanol. The white interpolymer was air dried on the funnel and then placed in a vacuum oven at 30° C. for final drying to yield 5.7 g of product. Analysis of the final product by proton NMR showed that 0.7 mole percent of the phenyl groups had been bromomethylated corresponding to 0.27 mol % of functionalized repeating units.

Example 4

A 120 mL wide mouth bottle was charged with 6.25 g (42 mmol of styrene) of ESI-1 and 50 mL of the desired solvent (methylene chloride, 1,2-dichloroethane, or tetrahydrofuran). The bottle was capped with a teflon lined lid and placed on a shaker overnight to dissolve the interpolymer. After the interpolymer had dissolved, tin tetrachloride was added to the bottle via a syringe and mixed with the interpolymer solution. Next, the chloromethylating agent and any other reagents (for example diethyl ether to moderate catalyst activity) were added to the bottle. The bottle was then placed on a shaker. At designated times aliquots of the reaction mixture were removed and precipitated into methanol. The samples were then dried in a vacuum oven at ambient temperature and then analyzed by proton NMR for the extent of chloromethylation. At the end of the run, the remaining reaction mixture was precipitated into an explosion proof Waring™ blender containing 500 mL of 50/50, v/v, methanol/acetone. The chloromethylated interpolymer was collected by filtration on a glass fritted funnel and was washed with an additional 50 mL of methanol. The white interpolymer was air dried on the funnel and then placed in a vacuum oven at 30° C. for final drying. Results are shown in Table 3. Rapid gellation of the reaction mixture occurred in Table 3 entries 1 and 2. At 45° C., gellation occurred immediately after catalyst addition. At 20° C., gellation occurred 4 minutes after catalyst addition. The solvent was eliminated as a candidate for the agent responsible for crosslinking by performing experiments without adding the chloromethylating agent. In these 'blank' experiments no gellation was observed (even after several days). It appears that in the presence of a very active catalyst, the benzylic chlorine group which is the product of the chloromethylation reaction undergoes further reaction to form a methylene bridge between two phenyl rings which crosslinks the ESI-1 polymer.

Moderation of the catalyst activity by adding diethyl ether to the reaction mixture allowed for the chloromethylation of ESI-1 copolymer to proceed while crosslinking was suppressed (Table 3, entry 3). The viscosity of the reaction mixture steadily increased with time although gellation was not observed. A 10 fold reduction in the amount of diethyl ether added led to gellation of the reaction mixture after 8 hours (Table 3, entry 4). Similar results were obtained in methylene chloride (Table 3, entries 5 and 6), however no chloromethylation whatsoever was observed when tetrahydrofuran was used as the solvent (Table 3, entry 7).

TABLE 3

CHLOROMETHYLATION OF ESI WITH SNCL$_4$ CATALYST

| Entry | ESI[1] (g) | Solvent/ (mL) | ROCH$_2$Cl/ (mmol) | SnCl$_4$ (mmol) | Et$_2$O (mL) | Temp (° C.) | Time (hr) | % chloro-methyl ation[5] | functionalized repeating units (mol %) |
|---|---|---|---|---|---|---|---|---|---|
| 1 | 25 | DCE[2]/200 | R = octyl/42 | 3.55 | 0 | 45 | 0 | gel | gel |
| 2 | 25 | DCE/200 | R = octyl/42 | 3.55 | 0 | 20 | 0.07 | gel | gel |
| 3 | 6.25 | DCE/50 | R = octyl/10.1 | 0.88 | 5 | 20 | 5 | 1.5 | 0.58 |
|   |   |   |   |   |   |   | 50 | 3.3 | 1.27 |
|   |   |   |   |   |   |   | 94 | 4.5 | 1.74 |
| 4 | 6.25 | DCE/50 | R = ethyl/10.1 | 0.88 | 0.5 | 20 | 8 | gel | gel |
| 5 | 6.25 | MeCl$_2$[3]/50 | R = octyl/10.1 | 0.88 | 0.5 | 20 | 3.5 | 4.7 | 1.81 |
|   |   |   |   |   |   |   | 18 | gel | gel |
| 6 | 6.25 | MeCl$_2$/50 | R = octyl/10.1 | 0.88 | 5 | 20 | 8 | 2.7 | 1.04 |
|   |   |   |   |   |   |   | 24 | 5.1 | 1.97 |
|   |   |   |   |   |   |   | 103 | 6.2 | 2.39 |
|   |   |   |   |   |   |   | 126[8] | 8.0 | 3.09 |
| 7[9] | 6.25 | THF[4]/50 | R = ethyl/10.1 | 0.88[6] | 0 | 20 | 8 | 0 | 0 |
|   |   |   |   |   |   |   | 24[7] | 0 | 0 |
|   |   |   |   |   |   |   | 126 | 0 | 0 |

[1]ESI-1, 70 wt % styrene containing ethylene - styrene copolymer
[2]DCE = 1,2-dichlorethane
[3]MeCl$_2$ = methylene chloride
[4]THF = tetrahydrofuran
[5]mole percent of phenyl groups chloromethylated determined by proton NMR
[6]reaction mixture heterogeneous upon addition of catalyst
[7]reaction mixture was originally heterogeneous but became homogeneous before this time
[8]reaction mixture very dark and viscous
[9]not an example of the invention Example 5

A procedure was undertaken in a manner similar to Example 4 except that zinc chloride was employed as the chloromethylation catalyst. The zinc chloride employed was a 1.0 molar anhydrous solution in diethyl ether. The results are shown in Table 4.

TABLE 4

CHLOROMETHYLATION OF ESI WITH ZNCL$_2$ CATALYST

| Entry | ESI[1] (g) | Solvent/ (mL) | ROCH$_2$Cl/ (mmol) | ZnCl$_2$[5] (mmol) | Temp (° C.) | Time (hr) | % chloro-methylation[6] | functionalized repeating units (mol %) |
|---|---|---|---|---|---|---|---|---|
| 1 | 6.25 | DCE[2]/50 | R = ethyl/10.6 | 0.9 | 20 | 8 | 3.3 | 1.27 |
|   |      |           |                |     |    | 24 | 4.2 | 1.62 |
|   |      |           |                |     |    | 77 | 5.5 | 2.12 |
|   |      |           |                |     |    | 126 | 6.3 | 2.43 |
| 2 | 6.25 | MeCl$_2$[3]/50 | R = ethyl/10.6 | 0.9 | 20 | 8 | 5.3 | 2.05 |
|   |      |           |                |     |    | 24 | 6.3 | 2.43 |
|   |      |           |                |     |    | 77[7] | 8.3 | 3.20 |
|   |      |           |                |     |    | 126 | Gel | gel |
| 3[8] | 6.25 | THF[4]/50 | R = ethyl/10.1 | 0.9 | 20 | 8 | 0 | 0 |
|   |      |           |                |     |    | 24 | 0 | 0 |
|   |      |           |                |     |    | 126 | 0 | 0 |

[1]ESI-1, 70 wt % styrene containing ethylene styrene interpolymer
[2]DCE = 1,2-dichloroethane
[3]MeCl$_2$ = methylene chloride
[4]THF = tetrahydrofuran
[5]1 Molar solution of zinc chloride in diethyl ether
[6]mole percent of phenyl groups chloromethylated as determined by proton NMR
[7]reaction mixture was extremely viscous
[8]not an example of the invention Example 6

A procedure was undertaken in a manner similar to Example 5 except that the parameters for chloromethylation of ESI-1 copolymer in methylene chloride, utilizing chloromethyl ethyl ether and zinc chloride were varied as shown in Table 5. The results of those experiments are summarized in Table 5.

TABLE 5

CHLOROMETHLATION OF ESI IN METHYLENE CHLORIDE WITH CHLOROMETHYL ETHYL ETHER AND ZINC CHLORIDE

| Entry[1] | EtOCH$_2$Cl (mmol) | mole ratio phenyl/ether[2] | ZnCl$_2$[3] (mmol) | mole ratio ether/catalyst[4] | Time (hr) | % chloro-methylation[5] | functionalized repeating units (mol %) |
|---|---|---|---|---|---|---|---|
| 1 | 10.6 | 4 | 0.45 | 23.6 | 4 | 1.6 | 0.62 |
|   |      |   |      |      | 9 | 2.3 | 0.89 |
|   |      |   |      |      | 24 | 3.2 | 1.24 |
|   |      |   |      |      | 48 | 4.0 | 1.54 |
|   |      |   |      |      | 72 | 4.4 | 1.70 |
|   |      |   |      |      | 100 | 4.7 | 1.81 |
|   |      |   |      |      | 144 | 5.0 | 1.93 |
| 2 | 10.6 | 4 | 0.9 | 11.8 | 8 | 5.3 | 2.05 |
|   |      |   |      |      | 24 | 6.3 | 2.43 |
|   |      |   |      |      | 77[6] | 8.3 | 3.20 |
|   |      |   |      |      | 126 | gel | gel |
| 3 | 10.6 | 4 | 1.8 | 5.9 | 4 | 2.5 | 0.97 |
|   |      |   |      |      | 9 | 3.7 | 1.43 |
|   |      |   |      |      | 24 | 5.7 | 2.20 |
|   |      |   |      |      | 48 | 6.5 | 2.51 |
|   |      |   |      |      | 72 | gel | gel |
| 4 | 5.3 | 8 | 0.9 | 5.9 | 4 | 1.4 | 0.54 |
|   |      |   |      |      | 9 | 2.2 | 0.85 |
|   |      |   |      |      | 24 | 3.3 | 1.27 |
|   |      |   |      |      | 48 | 3.7 | 1.43 |
|   |      |   |      |      | 72 | 4.2 | 1.67 |
|   |      |   |      |      | 100 | 4.4 | 1.70 |
|   |      |   |      |      | 122 | gel | gel |
| 5 | 21.2 | 2 | 0.9 | 23.6 | 4 | 2.7 | 1.04 |
|   |      |   |      |      | 9 | 3.9 | 1.51 |
|   |      |   |      |      | 24 | 5.6 | 2.16 |
|   |      |   |      |      | 48 | 6.9 | 2.66 |
|   |      |   |      |      | 72 | 7.5 | 2.89 |
|   |      |   |      |      | 100 | 8.0 | 3.09 |

TABLE 5-continued

CHLOROMETHLATION OF ESI IN METHYLENE CHLORIDE
WITH CHLOROMETHYL ETHYL ETHER AND ZINC CHLORIDE

| Entry[1] | EtOCH$_2$Cl (mmol) | mole ratio phenyl/ether[2] | ZnCl$_2$[3] (mmol) | mole ratio ether/catalyst[4] | Time (hr) | % chloro-methylation[5] | functionalized repeating units (mol %) |
|---|---|---|---|---|---|---|---|
| | | | | | 122 | 8.6 | 3.32 |
| | | | | | 144 | 10.9 | 4.21 |
| 6 | 5.3 | 8 | 0.225 | 23.6 | 4 | 0.7 | 0.27 |
| | | | | | 9 | 1.0 | 0.39 |
| | | | | | 24 | 1.5 | 0.58 |
| | | | | | 48 | 2.0 | 0.77 |
| | | | | | 72 | 2.3 | 0.89 |
| | | | | | 100 | 2.4 | 0.93 |
| | | | | | 123 | 2.7 | 1.04 |
| 7 | 42.3 | 1 | 1.8 | 23.5 | 4 | 4.3 | 1.66 |
| | | | | | 9 | 6.5 | 2.51 |
| | | | | | 24 | 9.9 | 3.82 |
| | | | | | 48 | 15.6 | 6.02 |
| | | | | | 72 | 15.9 | 6.14 |
| | | | | | 100 | 18.5 | 7.14 |
| | | | | | 123 | 19.5 | 7.53 |
| 8 | 211.6 | 0.2 | 9.0 | 23.5 | 4 | 13.8 | 5.33 |
| | | | | | 9 | 19.6 | 7.56 |
| | | | | | 24 | 28.7 | 11.08 |
| | | | | | 48 | 34.8 | 13.43 |
| | | | | | 72 | 38.7 | 14.94 |
| | | | | | 100 | 42.1 | 16.25 |
| | | | | | 123 | 43.8 | 16.90 |

[1]6.25 g (42.1 mmol of styrenic repeat units) of ESI-1 dissolved in 50 mL of methylene chloride, T = 20° C.
[2]ratio of moles of phenyl groups on ESI to moles of chloromethyl ethyl ether added to reaction mixture
[3]1 Molar solution of zinc chloride in diethyl ether
[4]ratio of moles of chloromethyl ethyl ether added to reaction mixture to moles of zinc chloride added to reaction mixture
[5]mole percent of phenyl groups chloromethylated determined by proton NMR
[6]reaction mixture was extremely viscous

EXAMPLE 7

Triethylammonium Ionomer of ESI

A 100 mL flask equipped with magnetic stirrer, water condenser, and N$_2$ inlet was charged with 1.0 g (0.42 mmol chloromethyl groups) of chloromethylated interpolymer having 70 weight percent styrene (6.3 mole percent of phenyl groups in interpolymer chloromethylated corresponding to 2.43 mol % of functionalized repeating units) and 20 mL of chloroform. After the interpolymer dissolved (~1 hr), 425 mg (4.2 mmol) of triethylamine was added to the reaction mixture. The flask was submerged in an oil bath thermostated at 60° C. and stirred for 20 hours. The treated interpolymer was then isolated by removal of the solvent by rotary evaporation (bath temp=40° C.) to give 1.0 g of a clear, slightly yellow film which was dried at 25° C. in a vacuum oven. Analysis of the sample by proton NMR (CDCl$_3$) revealed a new peak at 4.65 ppm (relative to tetramethylsilane) due to the benzylic methylene group of the ionomer as well as new peaks due to the ethyl groups bound to nitrogen. Integration of the proton NMR spectrum showed that 83% of the chloromethyl groups had been replaced by triethylammonium groups corresponding to 2.02 mol % of functionalized repeating units. The glass transition temperature of the interpolymer was broad with the inflection occurring at 17.4° C. A broad endotherm centered at 172° C. was also observed in the first scan but it was absent in a second scan. The ionomer is potentially useful in, for example, melt rheology modification, antistatic agent, ion exchange films, and polymeric biocides.

Example 8

Triphenylphosphonium Ionomer of ESI

A 100 mL flask equipped with magnetic stirrer, water condenser, and N$_2$ inlet was charged with 1.0 g (0.42 mmol chloromethyl groups) of chloromethylated interpolymer having 70 weight percent styrene (6.3 mole percent of phenyl groups in interpolymer chloromethylated corresponding to 2.43 mol % of functionalized repeating units) and 20 mL of chloroform. After the interpolymer dissolved (~1 hr), 1.0 g (3.81 mmol) of triphenylphosphine was added to the reaction mixture. The flask was submerged in an oil bath thermostated at 60° C. and stirred for 24 hours. The treated interpolymer was precipitated into 250 mL of isopropanol in an explosion proof blender and collected by vacuum filtration on a glass fritted funnel. The interpolymer was then placed in a vacuum oven and dried at 25° C. to yield 0.8 g of product. Analysis of the sample by proton NMR (CDCl$_3$) revealed a new peak at 5.2 ppm (relative to tetramethylsilane) due to the benzylic methylene group of the ionomer as well as new peaks due to the phenyl groups bound to phosphorous. Integration of the proton NMR spectrum showed that 77% of the chloromethyl groups have been replaced by triphenylphosphonium groups corresponding to 1.87 mol % of functionalized repeating units. The glass transition temperature of the interpolymer was 24.3° C. The ionomer is potentially useful in, for example, melt rheology modification, antistatic agent, ion exchange films, and polymeric biocides.

Example 9

Acetate Functional ESI

A 100 mL, flask equipped with magnetic stirrer, water condenser, and $N_2$ inlet was charged with 1.0 g (0.42 mmol chloromethyl groups) of chloromethylated interpolymer having 70 weight percent styrene (6.3 mole percent of phenyl groups in interpolymer chloromethylated corresponding to 2.43 mol % of functionalized repeating units) and 20 mL of chloroform. After the interpolymer dissolved (~1 hr), 1.6 g (4 mmol) of tetraphenylphosphonium acetate was added to the reaction mixture. The flask was submerged in an oil bath thermostated at 60° C. and stirred for 24 hours. The interpolymer was precipitated into 500 mL of 50/50, v/v, methanol/acetone in an explosion proof blender and collected by vacuum filtration on a glass fritted funnel. The interpolymer was then placed in a vacuum oven and dried at 25° C. to yield 0.96 g of product. Analysis of the sample by proton NMR ($CDCl_3$) revealed a new peak at 5.05 ppm (relative to tetramethylsilane) due to the benzylic methylene adjacent to the acetate group as well as a new peaks due to the methyl of the acetate. Integration of the proton NMR indicated near quantitative conversion of the chloromethyl group to the acetate. The glass transition temperature of the interpolymer was 22.7° C.

This type of ESI functionalization is potentially useful in, for example, incorporating branch and graft sites into ESI by reacting ESI-$CH_2$Cl with fatty acids or polymers bearing carboxylic acid groups; reacting an unsaturated acid (for example acrylic acid) with chloromethylated ESI to provide a site for free radical crosslinking or copolymerization with a host of vinyl monomers; imparting some polar character to the polymer; and attaching a variety of polymers to the ESI backbone (for example PET, nylon) by reactive blending.

Example 10

Hydroxyl Functional ESI

A 100 mL flask equipped with magnetic stirrer, water condenser, and $N_2$ inlet was charged with 0.5 g (0.20 mmol acetate groups) of acetate functional interpolymer of Example 9 having 70 weight percent styrene (6.3 mole percent of phenyl groups in interpolymer bear acetate group corresponding to 2.43 mol % of functionalized repeating units) and 20 mL of tetrahydrofuran. After the interpolymer dissolved, 0.65 g (1 mmol) of tetrabutylammonium hydroxide (40 wt % solution in water) was added to the reaction mixture. The flask was submerged in an oil bath thermostated at 60° C. and stirred for 24 hours. The interpolymer was precipitated into 500 mL of 50/50, v/v, methanol/acetone in an explosion proof blender and collected by vacuum filtration on a glass fritted funnel. The interpolymer was then placed in a vacuum oven and dried at 25° C. to yield 0.42 g of product. Analysis of the sample by proton NMR ($CDCl_3$) revealed a new peak at 4.6 ppm (relative to tetramethylsilane) due to the benzylic methylene adjacent to the hydroxyl group. Integration of the proton NMR indicated quantitative conversion of the acetate group to the hydroxyl group.

The hydroxyl functional ESI is potentially useful in, for example, compatibilizing ESI and other polymers such as epoxies, urethanes, polyesters, polycarbonates.

Example 11

Methyl Ether Functional ESI

A 100 mL flask equipped with magnetic stirrer, water condenser, and $N_2$ inlet was charged with 1.0 g (0.42 mmol chloromethyl groups) of chloromethylated interpolymer having 70 weight percent styrene (6.3 mole percent of phenyl groups in interpolymer chloromethylated corresponding to 2.43 mol % of functionalized repeating units) and 20 mL of tetrahydrofuran. After the interpolymer dissolved, 2 mL (4.85 mmol) of tetramethylammonium hydroxide (25 wt % solution in methanol) was added to the reaction mixture. The flask was submerged in an oil bath thermostated at 60° C. and stirred for 24 hours. The interpolymer was precipitated into 500 mL of 50/50, v/v, methanol/acetone in an explosion proof blender and collected by vacuum filtration on a glass fritted funnel. The interpolymer was then placed in a vacuum oven and dried at 25° C. to yield 0.98 g of product. Analysis of the sample by proton NMR ($CDCl_3$) revealed a new peaks at 4.39 and 3.35 ppm (relative to tetramethylsilane) due to the benzylic methylene adjacent to the methoxide group and the methyl of the methoxide group respectively. Integration of the proton NMR indicated quantitative conversion of the chloromethyl group to the methyl ether. The glass transition temperature of the interpolymer was 23.3° C.

Example 12

Phenyl Ether Functional ESI

A 100 mL flask equipped with magnetic stirrer, water condenser, and $N_2$ inlet was charged with 1.0 g (0.42 mmol chloromethyl groups) of chloromethylated interpolymer having 70 weight percent styrene (6.3 mole percent of phenyl groups in interpolymer chloromethylated corresponding to 2.43 mol % of functionalized repeating units) and 20 mL of tetrahydrofuran. In a second flask, 425 mg (2.14 mmol) of 4-hydroxybenzophenone was dissolved in 25 mL of methylene chloride and treated with 600 mg (1.64 mmol) of tetramethylammoniun hydroxide (25 wt percent in methanol). The solvent (MeOH, $CH_2Cl_2$) was removed from the phenate/phenol mixture by rotary evaporation. The residual yellow viscous oil was taken up in 10 mL of THF and added to the flask containing the interpolymer solution. The flask was submerged in an oil bath thermostated at 60° C. and stirred for 24 hours. The interpolymer was precipitated into 500 mL of 50/50, v/v, methanol/acetone in an explosion proof blender and collected by vacuum filtration on a glass fritted funnel. The interpolymer was then placed in a vacuum oven and dried at 25° C. to yield 1.0 g of product. Analysis of the sample' by proton NMR ($CDCl_3$) revealed a new peak at 5.08 ppm (relative to tetramethylsilane) due to the benzylic methylene adjacent to the new phenyl ether group and new peaks in the aromatic region due to the new substituent. Integration of the proton NMR indicated that 45 percent of the chloromethyl groups have been converted to aromatic ether groups corresponding to 1.09 mol % of functionalized repeating units.

The phenyl ether functional ESI is potentially useful in, for example, providing a good chromophore which may render ESI crosslinkable with UV light. Similarly, displacement of the halide with polymeric alcoholic or phenolic endgroups of PET, polycarbonate, PPO, poly(alkylene) oxide, polyacetal, polycaprolactone, etc. leads to grafting of these materials onto ESI.

Example 13

Cyano Functional ESI

A 100 mL flask equipped with magnetic stirrer, water condenser, and $N_2$ inlet was charged with 1.0 g (0.42 mmol chloromethyl groups) of chloromethylated interpolymer having 70 weight percent styrene (6.3 mole percent of phenyl groups in interpolymer chloromethylated corresponding to 2.43 mol % of functionalized repeating units) and 20 mL of tetrahydrofuran. After the interpolymer dissolved, 537 mg (2 mmol) of tetrabutylammonium cyanide was added to the reaction mixture. The flask was submerged in an oil bath thermostated at 60° C. and stirred for 24 hours. The interpolymer was precipitated into 500 mL of 50/50, v/v, methanol/acetone in an explosion proof blender and collected by vacuum filtration on a glass fritted funnel. The interpolymer was then placed in a vacuum oven and dried at 25° C. to yield 0.8 g of product. Analysis of the sample by proton NMR ($CDCl_3$) revealed a new peak at 3.65 ppm (relative to tetramethylsilane) due to the benzylic methylene adjacent to the cyano group. Integration of the proton NMR indicated near quantitative conversion of the chloromethyl group to the cyano group.

The cyano functional ESI is potentially useful in, for example, hydrolyzing the cyano group to a carboxylic amide or acid; reducing the cyano group to give ESI with pendant aliphatic amine groups; making ESI more polar.

Example 14

Reaction of ESI-1 With Acetyl Chloride 6.15 g of an ethylene styrene interpolymer (ESI-1, 70 wt percent styrene) was dissolved in 50 mL of dichloromethane. After dissolution of the polymer, 0.86 g (10.9 mmol) of acetyl chloride was added to the reaction mixture. Next, 17 mmol of aluminum chloride (1 molar solution of aluminum chloride in nitrobenzene, 17mL) was added to the reaction mixture. After 5 hours of mixing, the yellow/brown reaction mixture was precipitated into 500 mL of 50/50 v/v methanol/acetone in a blender. The white polymer was collected by filtration and then suspended in 500 mL of 0.1 M HCl for 20 minutes. The polymer was then collected by filtration and washed twice with water and once with methanol and then dried in a vacuum oven at 25° C. to yield 6.4 g of white polymer. A 300 mg portion of the polymer was pressed between teflon sheets into a thin, clear, colorless, creasable film at 200° C. with 20,000 lbs of load. Analysis of the film by infrared spectroscopy showed an intense peak at 1685 $cm^{-1}$ due to the ketone group. The polymer (100 mg) was dissolved in 2 g of deuterochloroform and analyzed by NMR spectroscopy. NMR chemical shifts referenced to tetramethylsilane (0 ppm). In the proton NMR of the polymer, new peaks were observed at 7.85 ppm (aromatic hydrogens alpha to acetyl group), and 2.55 ppm (methyl hydrogens of the acetyl group). Integration of the proton NMR spectrum revealed that 18.9 mole percent of the phenyl groups in the polymer contained the acetyl group corresponding to 7.29 mol % of functionalized repeating units. The carbon 13 NMR spectrum of the polymer was consistent with the assigned structure with the most distinguishing features being peaks at 198 ppm (carbon of the ketone group), and 26.6 ppm (methyl carbon of acetyl group). The glass transition temperature ($T_g$) of the polymer was 31° C. as measured by differential scanning calorimetry (DSC) at a scan rate of 10° C./min. The inflection of the step transition was taken as the $T_g$.

Example 15

Oxidation of Acetylated ESI 5 g of the acetylated ESI from Example 14 was dissolved in 100 mL of toluene in a 500 mL 3 neck flask equipped with mechanical stirrer and condenser by heating and stirring at 60° C. for 1 hour in an oil bath. After the polymer dissolved, 10 mL of aqueous bleach (5.25 wt percent NaOCl) and 0.75 mmol of cetyltrimethylammonium chloride (1 mL of a 25 wt % aqueous solution) was added to the reaction mixture. The oil bath surrounding the flask was heated to 110° C. and the reaction was allowed to proceed with vigorous stirring. Additional 10 mL aliquots of bleach were added to the reaction mixture after 8 hrs, 24 hrs, and 48 hrs. After 72 hours, the thick white reaction mixture was cooled and then precipitated into 500 mL of methanol in a blender. The polymer was collected by filtration. The damp filter cake (~10 g) was placed in 75 mL of tetrahydrofuran and rapidly formed a tight, translucent gel. Addition of 10 mL of 1 M HCl (in diethylether) to the tetrahydrofuran gel converts the sodium salt of the ionomer to the free carboxylic acid and yields a hazy nonviscous solution. The polymer solution was precipitated into 500 mL of methanol in a blender and the resulting white polymer collected by filtration, rinsed twice with 50 mL portions of methanol and then dried in a vacuum oven at 25° C. to yield 4.6 g of a white powder. A 300 mg portion of the polymer was pressed between teflon sheets into a thin, clear, colorless, creasable film at 200° C. with 20,000 lbs of load. Analysis of the film by infrared spectroscopy showed two carbonyl stretched at 1725 $cm^{-1}$ and 1685 $cm^{-1}$ due to both the carbonyl of the newly formed acid groups and the carbonyl of unreacted acetyl carbonyl groups respectively. The polymer (100 mg) was dissolved in 2 g of deuterochloroform and analyzed by NMR spectroscopy, NMR chemical shifts referenced to tetramethylsilane (0 ppm) In the proton NMR of the polymer a new peak were observed at 7.95 ppm (aromatic hydrogens alpha to carboxyl group). Integration of the proton NMR spectrum revealed that 4.8 mole percent of the phenyl groups in the polymer contained the carboxylic acid group corresponding to 1.85 mol % of functionalized repeating units and that 15.3 mole percent of the phenyl groups in the polymer contained the acetyl group corresponding to 5.9 mol % of functionalized repeating units. The carbon 13 NMR spectrum of the polymer was consistent with the assigned structure. The glass transition temperature ($T_g$) of the polymer was 33.5° C. as measured by differential scanning calorimetry (DSC) at a scan rate of 10° C./min. The inflection of the step transition was taken as the $T_g$.

Example 16

Reaction of ESI-1 with p-toluoyl Chloride 6.25 g of an ethylene styrene interpolymer (ESI-1, 70 wt percent styrene) was dissolved in 50 mL of dichloromethane. After dissolution of the polymer, 1.62 g (10.5 mmol) of p-toluoyl chloride was added to the reaction mixture. Next, 16 mmol of aluminum chloride (1 molar solution of aluminum chloride in nitrobenzene, 16 mL) was added to the reaction mixture. After 4 hours of mixing, the yellow/brown reaction mixture was precipitated into 500 mL of 50/50 v/v methanol/acetone in a blender. The white polymer was collected by filtration and then suspended in 500 mL of 0.1 M HCl for 30 minutes. The polymer was then collected by filtration and washed twice with water and twice with methanol and then dried in a vacuum oven at 25° C. to yield 6.9 g of white polymer. A 400 mg portion of the polymer was pressed between teflon sheets into a thin, clear, colorless, creasable film at 200° C. with 20,000 lbs of load. Analysis of the film by infrared spectroscopy showed an intense peak at 1660 cm$^{-1}$ due to the ketone group. The polymer (100 mg) was dissolved in 2 g of deuterochloroform and analyzed by NMR spectroscopy. NMR chemical shifts referenced to tetramethylsilane (0 ppm). In the proton NMR of the polymer several new features were observed the most prominent of which were new peaks were at 7.7 ppm (aromatic hydrogens alpha to ketone group), and 2.42 ppm (hydrogens of the benzylic methyl group). Integration of the proton NMR spectrum revealed that 16.3 mole percent of the phenyl groups in the polymer contained the toluoyl ketone group corresponding to 6.29 mol % of functionalized repeating units. The carbon 13 NMR spectrum of the polymer was consistent with the assigned structure with the assigned structure with the most distinguishing features being peaks at 196 pm (carbon of the ketone group), and 21.6 pm (benzylic methyl carbon). The glass transition temperature ($T_g$) of the polymer was 34° C. as measured by differential scanning calorimetry (DSC) at a scan rate of 10° C./min. The inflection of the step transition was taken as the $T_g$.

Example 17

Reduction of ESI with Pendant Aromatic Ketone Groups 3 g of the functionalized ESI from Example 16 was dissolved in 100 mL of dry tetrahydrofuran in a 250 mL 3 neck flask equipped with magnetic stirrer, condenser, and nitrogen inlet. After the polymer dissolved (~2 hrs), 10 mmol of lithium aluminum hydride (1M solution in diethylether, 10 mL) was added to the reaction mixture via syringe. Upon addition of the reducing agent, the viscosity of the reaction media increased dramatically making stirring difficult. An oil bath was placed around the flask and the apparatus was heated to 60° C. and held there for 3 hours. After cooling the reaction was quenched by the slow addition of 10 mL of methanol. The viscous reaction mixture was precipitated into 500 mL, of 1.25 M aqueous sulfuric acid in a blender. The polymer was collected by filtration and rinsed twice with 50 mL portions of methanol and then dried on the filter. The damp filter cake (~6 g) was placed in 80 mL of tetrahydrofuran and the mixture shaken until all of the polymer dissolved (overnight). The polymer solution was precipitated into 500 mL of methanol in a blender and the resulting white polymer collected by filtration, rinsed twice with 50 mL portions of methanol and then dried in a vacuum oven at 25° C. to yield 2.8 g of a light yellow powder. A 300 mg portion of the polymer was pressed between teflon sheets into a thin, clear, colorless, creasable film at 200° C. with 20,000 lbs of load. Analysis of the film by infrared spectroscopy showed broad peak centered at 3175 cm$^-$ due to the hydroxyl functionality and the noticeable absence of a peak in the carbonyl region. The polymer (100 mg) was dissolved in 2 g of deuterochloroform and analyzed by NMR spectroscopy. NMR chemical shifts referenced to tetramethylsilane (0 ppm). In the proton NMR of the polymer the peaks due to the ketone precursor were absent and new peaks were observed at 5.75 ppm (methine hydrogen alpha to hydroxyl group) and 3.75 ppm (hydrogen of hydroxyl group). Integration of the proton NMR spectrum revealed that 17.2 mole percent of the phenyl groups in the polymer contained the new hydroxyl group corresponding to 6.64 mol % of functionalized repeating units. The carbon 13 NMR spectrum of the polymer was consistent with the assigned structure with the most noticeable features being the absence of a peak in the carbonyl region and the presence of a new peak at 75.9 ppm (carbon attached to hydroxyl group). The glass transition temperature ($T_g$) of the polymer was 34.7° C. as measured by differential scanning calorimetry (DSC) at a scan rate of 10° C./min. The inflection of the step transition was taken as the $T_g$.

Example 18

Reaction of ESI-1 with Gamma-valerolactone 1.25 g of an ethylene styrene interpolymer (ESI-1, 70 wt percent styrene) was dissolved in 50 mL of dichloromethane. After dissolution of the polymer, 0.2 g (1.5 mmol) of aluminum chloride solid was added to the reaction mixture in one portion. Upon addition of AlCl$_3$, the reaction mixture turned pale yellow. Next, 84 mg (0.84 mmol) of gamma-valerolactone was added to the reaction mixture and the reaction mixture became homogeneous except for a few small clumps of AlCl$_3$. After 1 hour the clear, orange, viscous reaction mixture was precipitated into 500 mL of 50/50 v/v methanol/acetone in a blender. The white, fibrous polymer was collected by filtration and then suspended in 500 mL of 0.1 M aqueous HCl for 15 minutes. The polymer was then collected by filtration and washed twice with water and once with methanol and then dried in a vacuum oven at 25° C. to yield 1.11 g of a white fibrous polymer. A 300 mg portion of the polymer was pressed between teflon sheets into a thin, clear, colorless, creasable film at 200° C. with 20,000 lbs of load. Analysis of the film by infrared spectroscopy showed a broad peak at 3500 to 3000 cm$^{-1}$ due to the carboxylic acid group and a carbonyl stretch at 1710 cm$^{-1}$. The polymer (50 mg) dissolved in 3 g of 90/10 v/v chloroform/methanol to give a viscous solution.

Example 19

Reaction of ESI-1 with 2,4-butanesulfone 1.25 g of an ethylene styrene interpolymer (ESI-1, 70 wt percent styrene) was dissolved in 50 mL of dichloromethane. After dissolution of the polymer, 0.237 g (1.78 mmol) of aluminum chloride solid was added to the reaction mixture in one portion. Upon addition of AlCl$_3$, the reaction mixture turned pale yellow. Next, 135 mg (0.99 mmol) of 2,4-butanesulfone was added to the reaction mixture and the reaction mixture became homogenous except for a few small clumps of AlCl$_3$. After 1 hour the viscous reaction mixture was precipitated into 500 mL of 50/50 v/v methanol/acetone in a blender. The white polymer was collected by filtration and then suspended in 500 mL of 0.1 M aqueous H$_2$SO$_4$ for 15 minutes. The polymer was then collected by filtration with washed twice and water and once with methanol and then dried in a vacuum oven at 25° C. to yield 1.26 g of a white polymer. A 300 mg portion of the polymer was pressed between teflon sheets into a thin, clear, light yellow, creasable film at 260 C with 24,000 lbs of load. Analysis of the film by infrared spectroscopy showed a broad peaks at 1300 and 1140 cm$^{-1}$ due to the sulfonic acid group. The polymer (50 mg) dissolved in 3 g of 90/10 v/v chloroform/methanol to give a viscous solution.

Example 20

Reaction of ESI-1 with Succinic Anhydride 6.25 g of an ethylene styrene interpolymer (ESI-1, 70 wt percent styrene) was dissolved in 50 mL of dichloromethane. After dissolution of the polymer, 0.42 g (4.2 mmol) of succinic anhydride was added to the reaction mixture. The anhydride did not completely dissolve. Next, 8.4 mmol of aluminum chloride (1 molar solution of aluminum chloride in nitrobenzene, 8.4 mL) was added to the reaction mixture. Upon addition of AlCl$_3$, the reaction mixture turns yellow and the succinic anhydride dissolves. After 10 minutes of mixing, the reaction mixture was thick and gelatinous. After 2 hours, the reaction mixture was precipitated into 500 mL of 50/50 v/v methanol/acetone in a blender. The white polymer was collected by filtration and then suspended in 200 mL of 0.2 M HCl for 48 hours. The polymer was then collected by filtration and washed twice with water and twice with methanol and then dried in a vacuum oven at 25 C to yield 7.1 g of a granular powder. The polymer (50 mg) dissolved in 1.5 g of 80/20 v/v tetrahydrofuran/methanol to give a viscous solution. A 300 mg portion of the polymer was pressed between teflon sheets into a thin, clear, and creasable film at 250 C with 20,000 lbs of load. Analysis of the polymer film by infrared spectroscopy showed a broad peak at 3500 to 3000 cm$^{-1}$ due to the carboxylic acid group and two carbonyl stretches at 1690 and 1610 cm$^{-1}$.

Example 21

Reaction of ESI-2 with 4-vinylbenzoic Acid 40 g of an ethylene styrene interpolymer (35 wt percent Copolymer Styrene, 6.0 wt percent a tactic Polystyrene, ESI-2) was added to a Brabender mixer at 190° C. To the polymer melt, 1.2 g (8 mmol) of powdered vinylbenzoic acid was added. Finally, 107 μL of dodecylbenzenesulfonic acid was added and the molten mixture blended at 80 rpm for 5 minutes. After the allotted time, the Brabender was opened and the tan polymer melt was removed to yield 36.3 g of product. A 300 mg portion of the polymer was pressed between teflon sheets into a thin, clear, and creasable film at 210 C with 20,000 lbs of load. Analysis of the film by infrared spectroscopy showed a broad peak at 3500 to 3000 cm$^{-1}$ due to the carboxylic acid group and a carbonyl stretch at 1695 cm$^{-1}$. Dissolution of the polymer in warm xylene (15 mL/g of polymer) followed by precipitation into methanol did not change the IR spectrum of the product indicating that the vinylbenzoic acid was indeed grafted to the ethylene styrene copolymer and that the product was not simply a physical mixture of the two components.

Example 22

Reaction of ESI-3 with Chloromethylbenzoic Acid 40.0 of ethylene/styrene interpolymer (58 wt percent Copolymer Styrene, 3.0% atactic Polystyrene, ESI-3) was mixed with 0.080 g (0.49 mmol) FeCl$_3$ in a ZIPLOC™ bag. The mixture was added to a Haake Rheocord System 9000 Torque Rheometer equipped with a Haake 600 mixing bowl with roller style blades. The bowl temperature was 190° C. and the sample was mixed at 60 RPM. After 4 minutes, 1.5 g (8.8 mmol) of 4-chloromethylbenzoic acid was sprinkled into the mixing bowl. Over a period of 9 minutes, the torque increased from an initial value of 600 m.g to 1000 m.g. At t=20 minutes, the sample was removed from the mixing bowl. After compression molding, the tensile properties and TMA performance were measured.

Example 23

Reaction of ESI-3 with Chloromethylbenzoic Acid and Subsequent Conversion to the Zinc Ionomer via Addition of Zinc Oxide 40.0 of ethylene/styrene interpolymer (58 wt percent Copolymer Styrene, 3.0% atactic Polystyrene, ESI-3) was mixed with 0.080 g (0.49 mmol) FeCl$_3$ in a ZIPLOC™ bag. The mixture was added to a Haake Rheocord System 9000 Torque Rheometer equipped with a Haake 600 mixing bowl with roller style blades. The bowl temperature was 190° C. and the sample was mixed at 60 RPM. After 4 minutes, 1.5 g (8.8 mmol) of 4-chloromethylbenzoic acid was sprinkled into the mixing bowl. At t=10 minutes, 2.0 g of zinc oxide was added and the torque immediately increased from 800 m.g to 2100 m.g. At t=20 minutes, the sample was removed from the mixing bowl. After compression molding, the tensile properties and TMA performance were measured.

Example 24

Reaction of ESI-3 with Chloromethylbenzoic Acid and Subsequent Conversion to the Zinc Ionomer via Addition of Zinc Oxide 40.0 of ethylene/styrene interpolymer (58 wt percent Copolymer Styrene, 3.0% atactic Polystyrene, ESI-3) was mixed with 0.080 g (0.49 mmol) FeCl$_3$ in a ZIPLOC™ bag. The mixture was added to a Haake Rheocord System 9000 Torque Rheometer equipped with a Haake 600 mixing bowl with roller style blades. The bowl temperature was 190° C. and the sample was mixed at 60 rpm. After 4 minutes, 3.0 g (17.2 mmol) of 4-chloromethylbenzoic acid was sprinkled into the mixing bowl. At t=10 minutes, 2.8 g of zinc oxide was added and the torque immediately increased from 800 m.g. to 2600 m.g. At t=20 minutes, the sample was removed from the mixing bowl. After compression molding, the tensile properties and TMA performance were measured.

Example 25

Reaction of ESI-3 with Chloromethylbenzoic Acid and Subsequent Conversion to the Zinc Ionomer via Addition of Zinc Oxide Followed by Plasticization with Zinc Stearate 40.0 of ethylene/styrene interpolymer (58 wt percent Copolymer Styrene, 3.0 wt percent atactic Polystyrene, ESI-3) was mixed with 0.080 g (0.49 mmol) FeCl$_3$ in a ZIPLOC™ bag. The mixture was added to a Haake Rheocord System 9000 Torque Rheometer equipped with a Haake 600 mixing bowl with roller style blades. The bowl temperature was 190° C. and the sample was mixed at 60 RPM. After 4 minutes, 1.5 g (8.8 mmol) of 4-chloromethylbenzoic acid was sprinkled into the mixing bowl. At t=10 minutes, 2.0 g of zinc oxide was added and the torque immediately increased from 800 m.g to 2100 m.g. At t=15 minutes, 4.0 g of zinc stearate was added over a period of 3 minutes. At t=20 minutes, the sample was removed, and a final torque reading of 700 m.g, was recorded. After compression molding, the tensile properties and TMA performance were measured.

Examples 22–25 illustrate how functionalization of ESI can be used to increase the temperature resistance and tensile strength of ESI.

| Sample | TMA (c) | Break Stress (PSI) | % elongation |
| --- | --- | --- | --- |
| Example 22 | 64 | 800 | 470 |
| Example 23 | 98 | 2000 | 300 |
| Example 24 | 108 | 2500 | 250 |
| Example 25 | 85 | 2700 | 370 |
| Comparative Example (unmodified ESI-3) | 52 | 411 | 910 |

Example 26

Bromination of ESI-1

A 500 mL 3 neck flask equipped with a thermal well, mechanical stirrer, dry ice condenser with exit attached to a gas scrubber, and an addition funnel, and nitrogen inlet was charged with 25 g (0.17 mol styrene repeat units) of ESI-1 and 250 mL of methylene chloride. After complete dissolution of the interpolymer (~5 hrs), 1.7 mL (1.7 mmol) of a 1 molar solution of aluminum chloride in nitrobenzene was added to the apparatus. The flask was then wrapped in aluminum foil to exclude light and dry ice and acetone was added to the condenser. Bromine (27.2 g, 0.17 mol) was added dropwise to the flask from the addition funnel over the course of 1 hr. After the addition of bromine was complete, the reaction mixture was stirred for an additional hour with the dry ice condenser in place. The condenser was then removed and replaced with a gas outlet adapter which was also attached to the gas scrubber. The reaction mixture was stirred and swept with nitrogen for an additional hour. The reaction mixture was poured into a separatory funnel and washed with a solution of 15 g of sodium bisulfite in 100 ml of water and then twice with 100 ml portions of water. The polymer solution was then precipitated into 3 L of 50/50 v/v acetone/methanol in explosion proof Waring blender and the off-white polymer crumb was collected by vacuum filtration on a glass fritted funnel, washed once with 500 ml of methanol, air dried on the funnel and dried in a vacuum oven at 35° C. The isolated yield of brominated polymer was 33.75 g. Total bromine content of the sample 32+/−1 wt. percent (theoretical value is 35.3 wt. percent if each phenyl ring has one -Br substituent). Backbone halogenation was below the limit of detection (<0.1 wt.). By NMR approximately 90% of the phenyl rings were brominated corresponding to 34.7 mol % of functionalized repeating units, also by NMR the observed ratio of ortho:meta;para bromine relative to the attachment point of the phenyl ring to the polymer backbone is 19:0:81. The glass transition temperature of the brominated polymer was 54.5° C. and the dilute solution viscosity of the interpolymer in chloroform (~0.5 g/dL, 25° C.) was 0.97 dL/g.

Example 27

Nitration of ESI-1 (High Level)

A 1L, 3 neck flask equipped with mechanical stirrer, condenser, nitrogen inlet, and thermocouple was charged with 350 mL of chloroform and 15 g (~0.1 mol of styrene repeat units) of ESI-1. The reaction mixture was stirred at ambient temperature under a nitrogen atmosphere to dissolve the polymer (~2.5 hrs). After the polymer dissolved, 8.0 g (0.1 mol) of finely ground ammonium nitrate was added to the flask. Next, 46 mL (68.4 g, 0.326 mol) of trifluoroacetic anhydride was added in one portion. Upon addition of the anhydride, part of the polymer precipitated from solution but rapidly redissolved. As the reaction proceeded the ammonium nitrate slowly dissolved and the reaction mixture took on a yellow/orange color. After 70 hours the reaction mixture was precipitated into 3 L of 50/50, v/v, methanol/acetone in an explosion proof Waring blender. The polymer was collected by filtration on a glass fritted funnel and was washed with an additional 2 L of methanol. The granular light yellow polymer was air dried on the funnel and then placed in a vacuum oven at 30° C. for final drying. The isolated yield of nitrated polymer was 18.8 g.

A 300 mg sample of the polymer was pressed into a thin film at 200° C. between teflon sheets backed with stainless steel plates on a heated Carver laboratory press. The polymer film was clear and light yellow in color. The film was tough, bendable, creasable and significantly stiffer than a similar film of the unmodified ethylene styrene material (ESI-1). Analysis of the film by IR revealed new stretches at 1525, 1350, and 870 cm$^{-1}$ which are consistent with a material bearing nitro groups. The glass transition temperature of the polymer was 65° C. and it had a inherent solution viscosity of 0.45 dL/g (CHCl$_3$, 25° C.). Proton NMR analysis of the nitrated ethylene styrene copolymer was consistent with mono nitration of the majority of the pendant phenyl rings with the nitro group positioned in both the ortho and para positions. A new peak in the proton NMR spectrum at approximately 8.1 ppm is interpreted as arising from the two hydrogen atoms adjacent to the nitro group in the para position of the phenyl ring relative to the attachment point of the polymer backbone. Aromatic peaks unique for the material nitrated ortho and meta to the attachment point of the polymer backbone occured in the range of 7.5–8.0 ppm. A peak in the aliphatic region of the proton NMR at 2.9 ppm is unique for the benzylic methine proton of repeat units bearing a nitro group on the ortho position of the aromatic ring. The benzylic methine proton adjacent to unsubstituted phenyl rings and those bearing a nitro group in the meta or para positions of the aromatic ring form a broad singlet at 2.2–2.6 ppm. A ratio of the integral of the new aromatic peaks unique to the nitrated repeat units to the integral for all aromatic hydrogen atoms revealed that approximately 84 mole percent of the phenyl groups had been nitrated (4.5 mmol $NO_2$/g of polymer corresponding to 32.4 mol % of functionalized repeating units). Due to the overlapping of peaks, the ratio of ortho:meta:para ratio for nitration of the phenyl rings could not be determined from the proton NMR spectrum. The carbon 13 NMR spectrum of the nitrated material was used to determine the ortho:meta:para substitution ratio from the ratio of the integrated area of the peaks at 151.2, 148.2, and 146.3 ppm in the carbon spectrum (which are due to the aromatic ring carbons bearing the nitro group of ortho, meta, and para substituted species respectively). From these peaks the ratio of ortho:meta:para nitration is 8.7:3.1:88.2.

Example 28

Nitration of ESI-1 (Low Level)

A 500 mL, 3 neck flask equipped with mechanical stirrer, condenser, nitrogen inlet, and thermocouple was charged with 250 mL of chloroform and 30 g (~0.2 mol of styrene repeat units) of ESI-1. The reaction mixture was stirred at ambient temperature under a nitrogen atmosphere to dissolve the polymer (~2.5 hrs). After the polymer dissolved, 1.6 g (0.02 mol) of ammonium nitrate was added to the flask. Next, 10 mL (14.9 g, 0.07 mol) of trifluoroacetic anhydride was added in one portion. As the reaction proceeded the ammonium nitrate slowly dissolved and the reaction mixture took on a yellow/orange color. After 24 hours the reaction mixture was precipitated into 3 L of 50/50, v/v, methanol/acetone in an explosion proof Waring blender. The polymer was collected by filtration on a glass fritted funnel and was washed with an additional 2 L of methanol. The granular light yellow polymer was air dried on the funnel and then placed in a vacuum oven at 25° C. for final drying. The isolated yield of nitrated polymer was 29.5 g. The glass transition temperature of the polymer was 24° C. Proton NMR analysis of the nitrated ethylene styrene copolymer indicates that approximately 1.3 mole percent of the phenyl groups have been nitrated (0.09 mmol $NO_2$/g of polymer corresponding to 0.50 mol % of functionalized repeating units).

Example 30

Phenylhydrazine Reduction of Highly Nitrated Copolymer

A 100 mL flask equipped with a magnetic stir bar was charged with 540 mg of highly nitrated copolymer prepared as for Example 27 (~2.5 mmol $NO_2$ groups) and 20 mL of phenyl hydrazine. A water condenser topped with a nitrogen inlet was placed on the flask and the flask submerged in an oil bath at 150° C. After 10 minutes a clear orange solution resulted. The reaction mixture was stirred in the bath under a pad of nitrogen for 4.5 hours and then the bath temperature was increased to 200° C. The reaction mixture was held at 200° C. for 1 hour and then the flask containing the now golden yellow reaction mixture was removed from the bath and cooled to room temperature. The cooled polymer solution was precipitated into 500 mL of 85/15, v/v, water/methanol in an explosion proof blender. The polymer was collected by filtration on a glass fritted funnel and was washed 3 times with 40 mL portions of methanol. The granular gray polymer was air dried on the funnel and then placed in a vacuum oven at 30° C. for final drying. The isolated yield of polymer was 442 mg.

The glass transition temperature of the polymer was 66° C. The polymer dissolved easily in chloroform (100 mg of polymer in 2 g $CDCl_3$) to give a clear homogeneous solution but upon standing the solution gelled. We believe that the gellation was the result of the pendant amino groups reacting with chloroform (a multifunctional alkylating agent). The polymer was easily dissolved in tetrahydrofuran (70 mg polymer in 1 g THF-d8). No gellation was observed in THF even after several days. Proton NMR analysis of the aminated polymer in THF-d8 yielded a spectrum consistent with that expected for ES bearing amino functionality. The resonances due to the aromatic protons were shifted significantly upfield (>1 ppm) for the aminated polymer relative to those observed for the nitrated polymer. Additionally, a new peak positioned at approximately 4.2 ppm due to the hydrogen atoms on the nitrogen of the newly formed aniline functionality was observed. As in the case of the nitrated material, multiple peaks were observed for the benzylic methine protons along the polymer backbone arising from the different magnetic environments of these protons depending upon the substitution of the aromatic ring adjacent to it. A weighted ratio of the integral of the peak due to the amine hydrogens (4.2 ppm) to the total integral of the aromatic region revealed that approximately 83 mole percent of the phenyl groups bear the amino group corresponding to 32 mol % of functionalized repeating units. This is in excellent agreement with the calculated degree of nitration of the starting polymer.

Example 31

Sulfurated Borohydride Reduction of Low Nitrated Copolymer

A 100 mL flask equipped with a magnetic stir bar was charged with 500 mg of "low" nitrated ES copolymer (~0.045 mmol $NO_2$ groups) prepared as in Example 29. The flask was sealed with a septum and swept with nitrogen with one needle attached to a $N_2$ supply and a second needle piercing the septum and acting as a vent. The vent needle was then removed and the flask was kept under a pad of nitrogen. Dry tetrahydrofuran (25 mL) was added to the flask via syringe and the reaction mixture was stirred at ambient temperature to dissolve the polymer (1 hr). When the polymer had dissolved, sulfur (0.289 g, 9 mmol) was added to the reaction mixture rapidly in one portion by removing the septum. After the addition the septum was replaced and the reaction mixture stirred to dissolve the sulfur. When the sulfur had dissolved, 1.5 mL (3 mmol) of a 2 molar solution of lithium borohydride in tetrahydrofuran was added dropwise via a syringe (added over 1 minute). Upon addition of the borohydride, the reaction mixture becomes intensely yellow and gas is evolved. After gas evolution subsided, the septum was replaced with a condenser (topped with N2 inlet) and the flask was submerged in an oil bath and the reaction mixture gently refluxed. After approximately 30 minutes, the reaction mixture became a greenish/yellow gelatinous mass. Heating was continued overnight (total heating 17 hrs). The reaction mixture was then cooled to room temperature. The loose gel was precipitated into 500 mL of 50/50, v/v, methanol/water in an explosion proof blender to yield a yellowish colored polymer. The polymer was collected by filtration on a glass fritted funnel and was washed twice with 20 mL portions of methanol. The polymer was air dried on the funnel and then placed in a vacuum oven at 30° C. for final drying. The isolated yield of polymer was 510 mg.

The glass transition temperature of the polymer was 21.7° C. The polymer dissolved easily in chloroform (100 mg of polymer in 2 g $CDCl_3$) to give a clear homogeneous solution. No gellation problems were observed as noted above for the more highly functionalized material. Proton and carbon-13 NMR analysis of the aminated polymer in $CDCl_3$ yielded spectra consistent with that expected for ES bearing amino functionality but quantitation was difficult due to the low level of functionalization. A weighted ratio of the integral of the peak due to the amine hydrogens to the total integral of the aromatic region reveals that approximately 2 mole percent of the phenyl groups bear the amino group corresponding to 0.77 mol % of functionalized repeating units. This number is higher than expected (the starting material had 1.3 mole percent of phenyl groups nitrated) but the error on the number is high as it is near the detection limit for the NMR analysis.

What is claimed is:

1. A substantially random interpolymer comprising;
   (a) from 0 to about 64.95 mole percent of repeating units represented by the following formula (I):

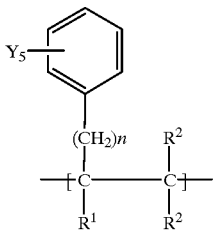

(I)

wherein Y is independently selected from the group consisting of hydrogen, benzyl radicals, aryl radicals, aralkyl radicals containing up to 18 carbon atoms, —C(O)$R^6$, —(Z)—$CO_2$H, —(Z)—$SO_3$H, —$NO_2$, —C(O)O$R^6$, —(Z)—O$R^6$, —N($R^6$)$_2$, —(Z)—N($R^6$)$_2$, —P(O$R^6$)$_2$, —(Z)—P(OR $^6$)$_2$, —P($R^6$)$_2$, —(Z)—P($R^6$)$_2$, —P(O)($R^6$)$_2$, —(Z)—P(O)($R^6$)$_2$, —P(O)(O$R^6$)$_2$, —(Z)—P(O)($R^6$)$_2$, —(Z)—S$R^6$, —CN, —(Z)—CN, —$CO_2$H, —C(O)N($R^6$)$_2$, —(Z)—C(O)N($R^6$)$_2$ ionomeric salts of —$CO_2^-$, —(Z)—$CO_2^-$, —(Z)—$SO_3^-$, —$N^+(R^6)_3$, —(Z)—$N^+(R^6)_3$, —$P^+(R^6)_3$, —(Z)—$P^+(R^6)_3$, —(Z)—$S^+(R^6)_2$, and mixtures thereof; $R^1$ is selected from the group of radicals consisting of hydrogen and alkyl radicals containing from 1 to 4 carbon atoms; $R^2$ is independently selected from the group of radicals consisting of hydrogen and alkyl radicals containing from 1 to 4 carbon atoms; $R^6$ is independently selected from the group of radicals consisting of hydrogen, substituted or unsubstituted alkyl radicals containing from 1 to 18 carbon atoms, and substituted or unsubstituted aryl radicals; and Z is alkylene or arylene; and n has a value from zero to 4;

(b) from about 0.05 to about 65 mole percent of repeating units represented by the following formula (II)

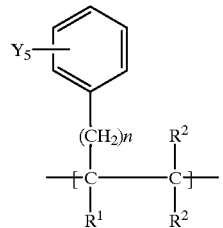

(II)

wherein Y, $R^1$, $R^2$, n, and X are as described for formula (I) with the proviso that at least one Y occurs predominately at the para position but also at the ortho position and is not hydrogen;

(c) from 0 to about 25 mole percent of repeating units represented by the following formula (III):

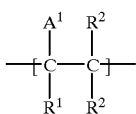

(III)

wherein $R^1$ and $R^2$ are as described for formula (I) and $A^1$ is a sterically bulky, aliphatic or cycloaliphatic substituent of up to 20 carbons or $R^2$ and $A^1$ together form a ring system wherein the ring system formed by $A^1$ and $R^2$ is optionally substituted with one or more substituents selected from the group consisting of substituted and unsubstituted alkyl radicals, benzyl radicals, aryl radicals, and aralkyl radicals containing up to 18 carbon atoms, —C(O)$R^6$, —(Z)—$CO_2$H, —(Z)—$SO_3$H, —$NO_2$, —C(O)O$R^6$—(Z)—O$R^6$, —N($R^6$)$_2$, —(Z)—N($R^6$)$_2$, —P(O$R^6$)$_2$, —(Z)—P(O$R^6$)$_2$, —P($R^6$)$_2$, —(Z)—P($R^6$)$_2$, —P(O)($R^6$)$_2$, —(Z)—P(O)($R^6$)$_2$, —P(O)(O$R^6$)$_2$, —(Z)—P(O)($R^6$)$_2$, —(Z)—S$R^6$, —CN, —(Z)—CN, —$CO_2$H, —C(O)N($R^6$)$_2$, —(Z)—C(O)N($R^6$)$_2$, ionomeric salts of —$CO_2^-$, —(Z)—$CO_2^-$, —(Z)—$SO_3^-$, —$N^+(R^6)_3$, —(Z)—$N^+(R^6)_3$, —$P^+(R^6)_3$, —(Z)—$P^+(R^6)_3$, —(Z)—$S^+(R^6)_2$, and mixtures thereof, wherein $R^6$, X, and Z are as defined above for formula (I); and (d) from 35 to 99.95 mole percent of repeating units represented by the following formula (IV);

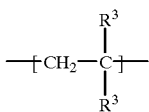

(IV)

wherein $R^3$ and $R^4$ are selected from the group consisting of hydrogen and alkyl radicals having from 1 to 18 carbon atoms, with the proviso that $R^3$ and $R^4$ are different alkyl radicals.

2. The substantially random interpolymer of claim 1 comprising from 0 to about 50 mole percent of repeating units of formula I; from about 0.5 to about 50 mole percent of repeating units of formula II; from 0 to about 5 mole percent of repeating units of formula III; and from about 50 to about 99.5 mole percent of repeating units of formula IV.

3. The substantially random interpolymer of claim 2 wherein Z is alkylene having from 1 to 4 carbon atoms or phenylene.

4. The substantially random interpolymer of claim 1 comprising from 0.5 to 50 mole percent of repeating units of formula II and from about 50 to about 99.5 mole percent of repeating units of Formula IV.

5. The substantially random interpolymer of claim 1 wherein the Y group is selected from the group consisting of, —C(O)R$^6$, —(Z)—CO$_2$H, —(Z)—SO$_3$H, and —NO$_2$.

6. The substantially random interpolymer of claim 1 wherein Y is independently selected from the group consisting of unsubstituted or substituted alkylcarbonyl, arylcarbonyl, aralkyl groups; alkyl groups substituted with carboxylic acid or sulfonic acid groups; NO$_2$; NH$_2$, acyl, substituted or unsubstituted phenylcarbonyl and carboxyalkylcarbonyl; substituted or unsubstituted carboxybenzyl; —C(O)Me, —CO$_2$H, —C(O)-pC$_6$H$_4$-Me, —CH(OH)-pC$_6$H$_4$-Me, —CH(R$^5$)CH$_2$CH$_2$CO$_2$H, —CH(R$^5$)CH$_2$CH$_2$SO$_3$H, —CH(R$^5$)-pC$_6$H$_4$-CO$_2$H, C(O)CH$_2$CH$_2$CO$_2$H, ionomeric salts of —CO$_2^-$, —(Z)—CO$_2^-$, —(Z)—SO$_3^-$, —N$^+$(R$^6$)$_3$, —(Z)—N$^+$(R$^6$)$_3$, —P$^+$(R$^6$)$_3$, —(Z)—P$^+$(R$^6$)$_3$, —(Z)—S$^+$(R$^6$)$_2$, and mixtures thereof, and wherein R$^5$ is hydrogen or an alkyl group.

7. A substantially random interpolymer comprising repeating units derived from
 (1) monomer units derived from
  (i) at least one vinyl or vinylidene aromatic monomer, or
  (ii) a combination of at least one vinyl or vinylidene aromatic monomer and at least one sterically hindered aliphatic or cycloaliphatic vinyl or vinylidene monomer; and
 (2) monomer units derived from
  (i) ethylene, or
  (ii) C$_{3-20}$-olefin; or
  (iii) a combination of ethylene and C$_{3-20}$-olefin wherein the aromatic group of one or more of said vinyl or vinylidene aromatic monomers is functionalized subsequent to interpolymer formation predominately at the para position but also at the ortho position with one or more substituents selected from the group consisting of benzyl radicals, aryl radicals, aralkyl radicals containing up to 18 carbon atoms, -, —C(O)R$^6$, —(Z)—CO$_2$H, —(Z)—SO$_3$H, —NO$_2$, —C(O)OR$^6$—(Z)—OR$^6$, —N(R$^6$)$_2$, —(Z)—N(R$^6$)$_2$, —P(OR$^6$)$_2$, —(Z)—P(OR$^6$)$_2$, —P(R$^6$)$_2$, —(Z)—P(R$^6$)$_2$, —P(O)(R$^6$)$_2$, —(Z)—P(O)(R$^6$)$_2$, —P(O)(OR$^6$)$_2$, —(Z)—P(O)(R$^6$)$_2$, —(Z)—SR$^6$, —CN, —(Z)—CN, —CO$_2$H, —C(O)N(R$^6$)$_2$, —(Z)—C(O)N(R$^6$)$_2$, ionomeric salts of —CO$_2^-$, —(Z)—CO$_2^-$, —(Z)—SO$_3^-$, —N$^+$(R$^6$)$_3$, —(Z)—N$^+$(R$^6$)$_3$, P$^+$(R$^6$)$_3$, —(Z)—P$^+$(R$^6$)$_3$, —(Z)—S$^+$(R$^6$)$_2$, and mixtures thereof; R$^1$ is selected from the group of radicals consisting of hydrogen and alkyl radicals containing from 1 to 4 carbon atoms; R$^2$ is independently selected from the group of radicals consisting of hydrogen and alkyl radicals containing from 1 to 4 carbon atoms; R$^6$ is independently selected from the group of radicals consisting of hydrogen, substituted or unsubstituted alkyl radicals containing from 1 to 18 carbon atoms, and substituted or unsubstituted aryl radicals; and Z is alkylene or arylene; and n has a value from zero to 4.

8. The substantially random interpolymer of claim 7 which further comprises monomer units derived from one or more ethylenically unsaturated polymerizable monomers other than (1) or (2).

9. The substantially random interpolymer of claim 8 wherein the monomers other than (1) or (2) are norbornene and C$_{1-10}$ alkyl or C$_{6-10}$ aryl substituted norbornenes.

10. The substantially random interpolymer of claim 7 which comprises from 5 to 65 mole percent of monomer units derived from said vinyl or vinylidene aromatic monomer and wherein 1 to 100 percent of said monomer units derived from said vinyl or vinylidene aromatic monomer are substituted with one or more of said substituents.

11. The substantially random interpolymer of claim 7 wherein said vinyl or vinylidene aromatic monomer is styrene.

12. The substantially random interpolymer of claim 7 wherein Component (1) is styrene and Component (2) is ethylene.

\* \* \* \* \*